US011629088B2

(12) United States Patent
Bui et al.

(10) Patent No.: US 11,629,088 B2
(45) Date of Patent: Apr. 18, 2023

(54) ACTIVELY CONTROLLED LASER PROCESSING OF TRANSPARENT WORKPIECES

(71) Applicant: Corning Incorporated, Corning, NY (US)

(72) Inventors: Duc Anh Bui, Krailling (DE); Xinghua Li, Horseheads, NY (US); Ralf Joachim Terbrueggen, Neuried (DE)

(73) Assignee: CORNING INCORPORATED, Corning, NY (US)

( * ) Notice: Subject to any disclaimer, the term of this patent is extended or adjusted under 35 U.S.C. 154(b) by 802 days.

(21) Appl. No.: 16/443,020

(22) Filed: Jun. 17, 2019

(65) Prior Publication Data

US 2019/0382300 A1     Dec. 19, 2019

Related U.S. Application Data

(60) Provisional application No. 62/686,976, filed on Jun. 19, 2018.

(51) Int. Cl.
*C03B 33/02* (2006.01)
*B23K 26/00* (2014.01)
(Continued)

(52) U.S. Cl.
CPC ...... *C03B 33/0222* (2013.01); *B23K 26/0006* (2013.01); *B23K 26/032* (2013.01);
(Continued)

(58) Field of Classification Search
CPC ... C03B 33/0222; C03B 33/04; C03B 33/091; C03B 33/037; B23K 26/032;
(Continued)

(56) References Cited

U.S. PATENT DOCUMENTS 8,748,774 B2 * 6/2014 Suzuki ............ B23K 9/00
2002/0125232 A1 * 9/2002 Choo
(Continued)

FOREIGN PATENT DOCUMENTS

CN    103028846 A     4/2013
CN    106029588 A    10/2016
(Continued)

OTHER PUBLICATIONS

TSAI , Applying an On-Line Crack Detection Technique for Laser Cutting by Controlled Fracture, 2001, Springer-Verlag, Journal of Advanced Manufacturing Technology 18:724-730 (Year: 2001).*
(Continued)

*Primary Examiner* — Hung D Nguyen

(57) ABSTRACT

A method for processing a transparent workpiece includes forming a contour of defect in the transparent workpiece and separating the transparent workpiece along the contour using an infrared laser beam. During separation, the method also includes detecting a position and propagation direction of a crack tip relative to a reference location and propagation direction of an infrared beam spot, determining a detected distance and angular offset between the crack tip and the reference location of the infrared beam spot, comparing the detected distance to a preset distance, comparing the detected angular offset to a preset angular offset, and modifying at least one of a power of the infrared laser beam or a speed of relative translation between the infrared laser beam and the transparent workpiece in response to a difference between the detected distance and the preset distance and between the detected angular offset and the preset angular offset.

21 Claims, 10 Drawing Sheets

(51) Int. Cl.
*B23K 26/359* (2014.01)
*B23K 26/03* (2006.01)
*B23K 26/06* (2014.01)
*B23K 26/08* (2014.01)
*B23K 103/00* (2006.01)

(52) U.S. Cl.
CPC ...... *B23K 26/0604* (2013.01); *B23K 26/0626* (2013.01); *B23K 26/0876* (2013.01); *B23K 26/359* (2015.10); *B23K 2103/54* (2018.08)

(58) Field of Classification Search
CPC ............ B23K 26/0604; B23K 26/0626; B23K 26/359; B23K 2103/54; B23K 26/0648; B23K 26/0652; B23K 26/0624; B23K 26/1224; B23K 26/50–57; B23K 26/38–389; B23K 15/08–085; B23K 26/0006; B23K 26/0876; B23K 26/0738; B23K 2101/40

See application file for complete search history.

(56) References Cited

U.S. PATENT DOCUMENTS

| | | |
|---|---|---|
| 2013/0032582 A1 | 2/2013 | Henley |
| 2013/0087536 A1 | 4/2013 | Suzuki et al. |
| 2015/0360991 A1 | 12/2015 | Grundmueller et al. |
| 2017/0197868 A1 | 7/2017 | Gupta et al. |
| 2017/0355635 A1 | 12/2017 | Li |
| 2018/0021885 A1* | 1/2018 | OConnor ............... B23K 26/03 |

FOREIGN PATENT DOCUMENTS

| | | | |
|---|---|---|---|
| CN | 107207318 A | 9/2017 | |
| EP | 2945769 A1 | 11/2015 | |
| JP | 10-258374 A | 9/1998 | |
| JP | 3825123 B2 * | 9/2006 | |
| WO | 2013084879 A1 | 6/2013 | |
| WO | 2014/111385 A1 | 7/2014 | |
| WO | WO 2015/095146 A1 * | 6/2015 | ............. C03B 33/02 |
| WO | 2016/081548 A1 | 5/2016 | |
| WO | WO 2016/081548 * | 5/2016 | ............. C03B 33/09 |

OTHER PUBLICATIONS

Borghi et la; "M2 Factor of Bessel-Gauss Beams"; Optics Letters; vol. 22, No. 5, 1997; pp. 262-264.

Siegman; "New Developments in Laser Resonators"; Proc. SPIE 1224; Optical Resonators; 1990; pp. 2-14.

International Search Report and Written Opinion of the European International Searching Authority; PCT/US2019/036983; dated Oct. 9, 2019; 12 Pgs.

Chinese Patent Application No. 201980052524.6, Office Action, dated Jun. 21, 2022, 28 pages, (15 pages of English Translation and 13 pages of Original Copy); Chinese Patent Office.

* cited by examiner

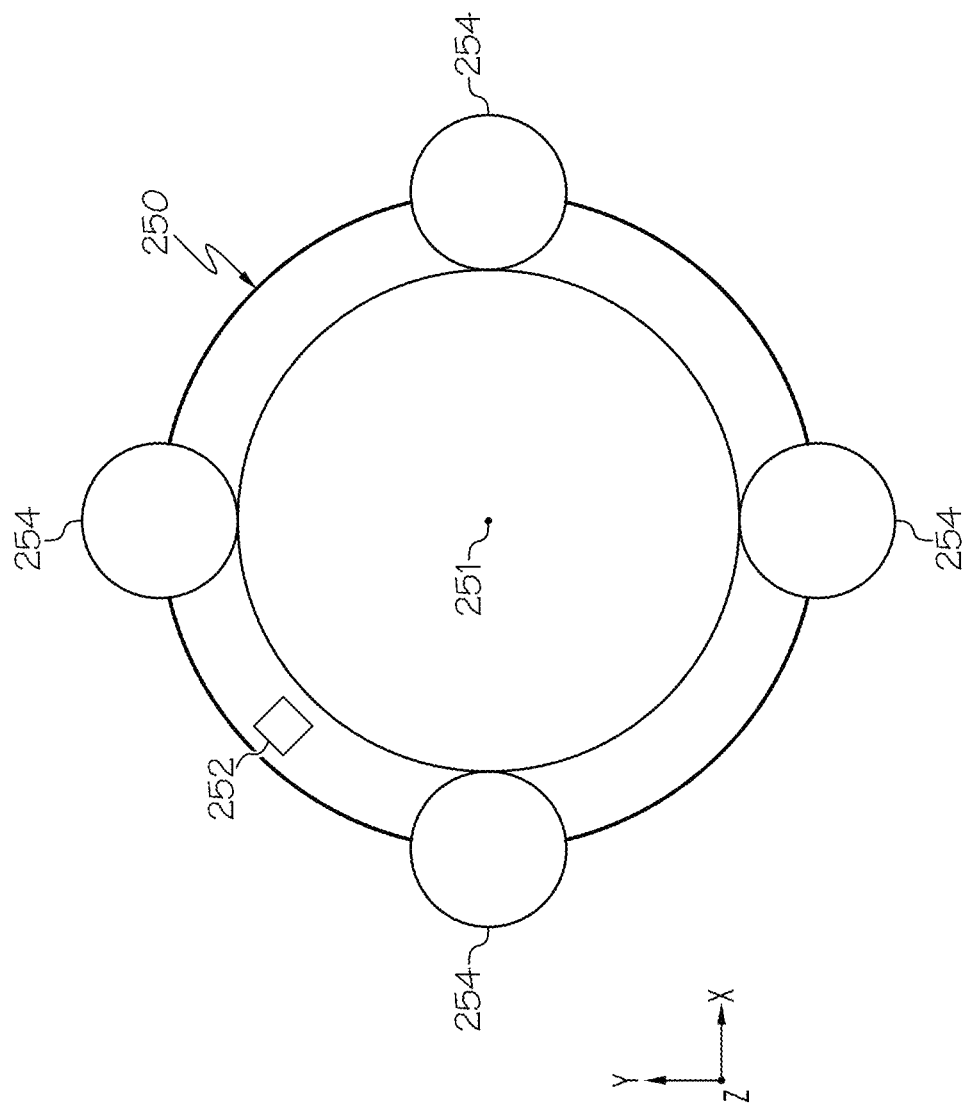

ACTIVELY CONTROLLED LASER PROCESSING OF TRANSPARENT WORKPIECES

This application claims the benefit of priority to U.S. Provisional Application Ser. No. 62/686,976 filed on Jun. 19, 2018, the content of which is relied upon and incorporated herein by reference in its entirety.

BACKGROUND

Field

The present specification generally relates to apparatuses and methods for laser processing transparent workpieces, and more particularly, to actively controlled laser processing of transparent workpieces.

Technical Background

The area of laser processing of materials encompasses a wide variety of applications that involve cutting, drilling, milling, welding, melting, etc. of different types of materials. Among these processes, one that is of particular interest is cutting or separating different types of transparent substrates in a process that may be utilized in the production of materials such as glass, sapphire, or fused silica for thin film transistors (TFT) or display materials for electronic devices.

From process development and cost perspectives there are many opportunities for improvement in cutting and separating glass substrates. It is of great interest to have a faster, cleaner, cheaper, more repeatable, and more reliable method of separating glass substrates than what is currently practiced in the market. Accordingly, a need exists for alternative improved methods for separating glass substrates.

SUMMARY

According to one embodiment, a method for processing a transparent workpiece includes forming a contour along a contour line in the transparent workpiece, the contour including a plurality of defects in the transparent workpiece and separating the transparent workpiece along the contour. Separating the transparent workpiece includes directing an infrared laser beam output by an infrared beam source onto the transparent workpiece on or near the contour line to induce formation of a crack in the transparent workpiece, where the infrared laser beam projects an infrared beam spot on a surface of the transparent workpiece, translating the transparent workpiece and the infrared laser beam relative each other along or near the contour line to induce propagation of the crack along the contour, where during propagation of the crack, the crack includes a crack tip, and detecting a position and propagation direction of the crack tip relative to a reference location and propagation direction of the infrared beam spot. Separating the transparent workpiece also includes determining a detected distance between the crack tip and the reference location of the infrared beam spot, determining a detected angular offset between the propagation direction of the crack tip and the propagation direction of the infrared beam spot, comparing the detected distance to a preset distance, comparing the detected angular offset to a preset angular offset, and modifying at least one of a power of the infrared laser beam or a speed of relative translation between the infrared laser beam and the transparent workpiece in response to a difference between the detected distance and the preset distance and a difference between the detected angular offset and the preset angular offset.

According to another embodiment, a method for processing a transparent workpiece includes forming a contour along a contour line in the transparent workpiece, the contour including a plurality of defects in the transparent workpiece and a curved contour portion, and separating the transparent workpiece along the contour. Separating the transparent workpiece includes directing an infrared laser beam output by an infrared beam source along an infrared beam pathway onto the transparent workpiece on or near the contour line to induce formation of a crack in the transparent workpiece, translating the transparent workpiece and the infrared laser beam relative each other along or near the contour line to induce propagation of the crack along the contour, where during propagation of the crack, the crack includes a crack tip, and detecting a position of the crack tip and a position of an infrared beam spot of the infrared laser beam. Separating the transparent workpiece also includes terminating crack-inducing irradiation from the infrared laser beam when the infrared beam spot reaches a first reference point located along the contour line, translating the transparent workpiece and the infrared beam pathway relative each other from the first reference point to a second reference point located along the contour line, where the first reference point is located behind the second reference point and at least some of the curved contour portion is disposed between the first reference point and the second reference point, and resuming crack-inducing irradiation from the infrared laser beam and translation of the transparent workpiece and the infrared laser beam relative each other along or near the contour line when the crack tip reaches a third reference point located along the contour line, where the first reference point is located behind the third reference point and at least some of the curved contour portion is disposed between the first reference point and the third reference point.

According to another embodiment, a method for processing a transparent workpiece, includes: forming a contour along a contour line in the transparent workpiece, the contour comprising a plurality of defects in the transparent workpiece; separating the transparent workpiece along the contour, wherein separating the transparent workpiece comprises: directing an infrared laser beam output by an infrared laser beam source onto the transparent workpiece on or near the contour line to induce formation of a crack in the transparent workpiece, wherein the infrared laser beam projects an infrared beam spot on a surface of the transparent workpiece; translating the transparent workpiece and the infrared laser beam relative to each other along or near the contour line to induce propagation of the crack along the contour, wherein during propagation of the crack, the crack comprises a crack tip; detecting a position and propagation direction of the crack tip relative to a reference location and propagation direction of the infrared beam spot; determining a detected distance between the crack tip and the reference location of the infrared beam spot; comparing the detected distance to a preset distance; and modifying at least one of a power of the infrared laser beam or a speed of relative translation between the infrared laser beam and the transparent workpiece in response to a difference between the detected distance and the preset distance.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 6 schematically depicts the imaging system of the optical assemblies of FIGS. 4 and 5, according to one or more embodiments shown and described herein;

DETAILED DESCRIPTION

Figure 1A:
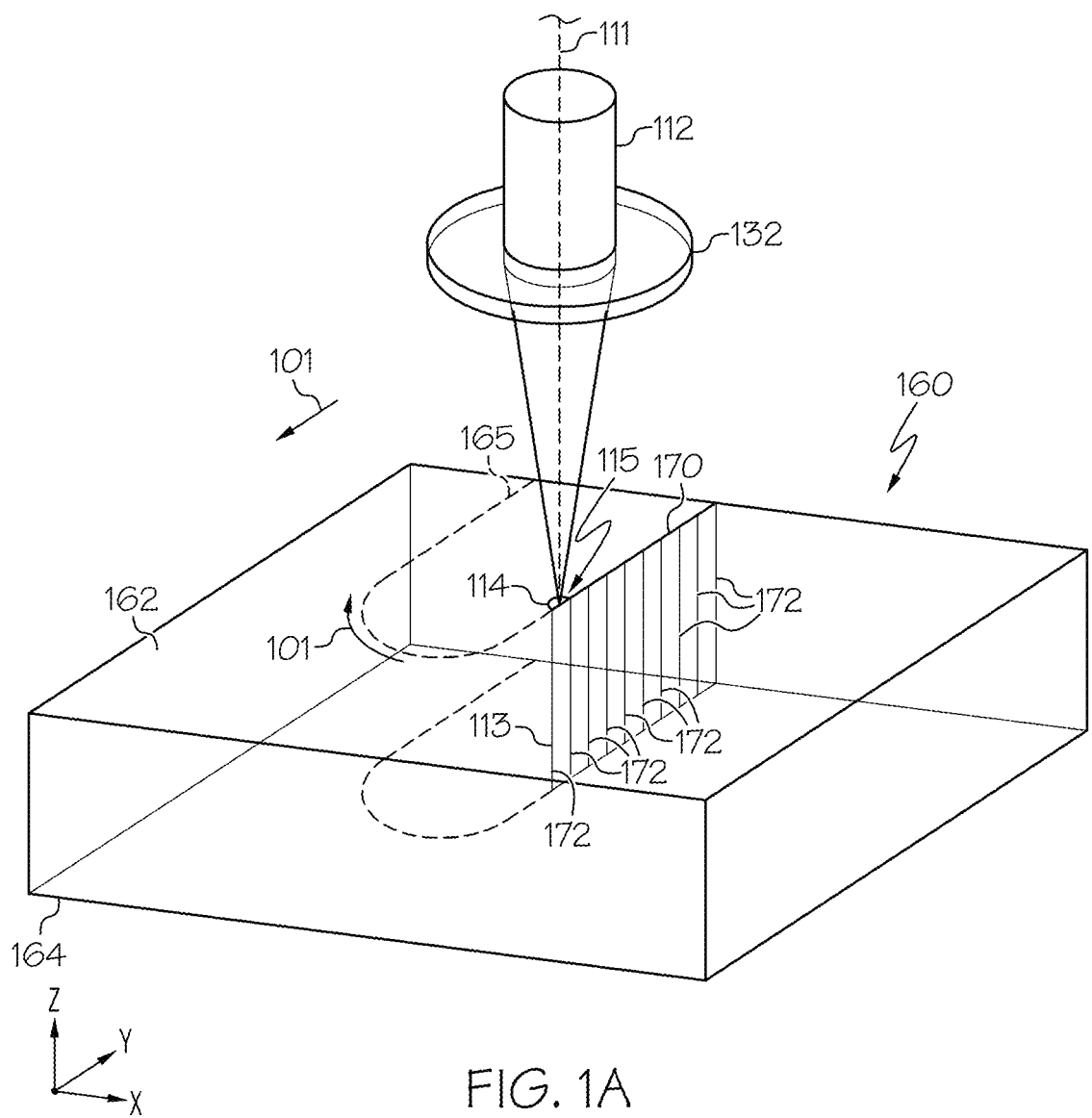
FIG. 1A schematically depicts the formation of a contour of defects in a transparent workpiece according to one or more embodiments described herein.

Reference will now be made in detail to embodiments of laser processing a transparent workpiece, examples of which are illustrated in the accompanying drawings. Whenever possible, the same reference numerals will be used throughout the drawings to refer to the same or like parts. Laser processing a transparent workpiece may comprise forming a contour comprising a plurality of defects in the transparent workpiece using a defect forming laser beam (e.g., a pulsed laser beam) and separating the transparent workpiece using an infrared laser beam. In the embodiments described herein, irradiating the contour comprising a plurality of defects with an infrared laser beam and translating the infrared laser beam and the transparent workpiece relative to one another along the contour may induce propagation of a crack along the contour to separate the transparent workpiece. During separation, the crack may propagate at an inconsistent rate and thus, uniform relative translation speed between the transparent workpiece and the infrared laser beam and/or uniform laser power may result in deviations of the crack from the contour causing hackle, bifurcations, and other unwanted irregularities. Thus, to facilitate consistent separation of the crack, the present application includes methods and systems to image the crack tip, determine the distance between the crack tip and the and infrared beam spot of the infrared laser beam, and alter the relative translation speed between the transparent workpiece and the infrared laser beam and/or the laser power of the infrared laser beam based on the measured distance.

In addition, the contour may include one or more curved contour portions, further complicating the separation process. For example, when the crack tip traverses a curved contour portion, the propagation direction of the crack tip may differ from the propagation direction of the infrared laser beam, altering the geometric relationship between the infrared beam spot and the crack tip. Thus, to reduce and/or prevent hackle, bifurcations, and other unwanted irregularities, the methods described herein may further comprise altering the relative translation speed between the transparent workpiece and the infrared laser beam and/or the laser power of the infrared laser beam based on an angular offset between the propagation directions of the crack tip and the infrared beam spot. Moreover, excessive heat may accumulate within the material near the curved contour portion when the infrared laser beam traverses the curved contour portion due to the geometry of the curved portion, generating unwanted chipping and/or cracking during separation. As such, methods of separating the transparent workpiece described herein may also include terminating crack-inducing irradiation from the infrared laser beam when the crack is propagating through some or all of the curved contour portion, allowing latent heat accumulation to propel crack propagation through the curved contour portion and resuming crack-inducing irradiation from the infrared laser beam at a location of the contour beyond the curved contour portion. Various embodiments of laser processing of a transparent workpiece will be described herein with specific references to the appended drawings.

As used herein, "laser processing" comprises directing a laser beam onto and/or into a transparent workpiece. In some embodiments, laser processing further comprises translating the laser beam (or a laser beam pathway when the laser beam is not being output by its beam source) relative to the transparent workpiece, for example, along a contour line, along a contour, or along another pathway. Examples of laser processing include using a defect forming laser beam (such as pulsed laser beam) to form a contour comprising a series of defects that extend into the transparent workpiece and using an infrared laser beam to heat the transparent workpiece. Laser processing may separate the transparent workpiece along one or more desired lines of separation. However, in some embodiments, additional, non-laser steps may be utilized to separate the transparent workpieces along one or more desired lines of separation.

As used herein, "contour line," denotes a linear, angled, polygonal or curved line on a surface of a transparent workpiece that defines the path traversed by one or more laser beams as each of the one or more laser beams is moved within the plane of the workpiece to create a corresponding contour and separate the workpiece along the contour and contour line.

As used herein, "contour," refers to a set of defects in a workpiece formed by translating a laser along a contour line. As used herein, a contour refers to a virtual two dimensional shape or path in or on a substrate. Thus, while a contour itself is a virtual shape, the contour may be manifest, for example, by a fault line or a crack. A contour defines a surface of desired separation in the workpiece. A contour may be formed by creating a plurality of defects in the transparent workpiece using various techniques along the contour line, for example by directed a pulsed laser beam at successive points along the contour line. Multiple contours and/or lasers with curved focal lines may be used to create complex shapes, such as a beveled surface of separation.

As used herein, a "defect" refers to a region of modified material (e.g., a region of modified refractive index relative to the bulk material), void space, crack, scratch, flaw, hole, perforation or other deformities in the transparent workpiece. These defects may be referred to, in various embodiments herein, as defect lines or damage tracks. A defect line or damage track is formed by a laser beam directed onto a single position of the transparent workpiece, for a single laser pulse or multiple pulses at the same location. Translating the laser along the contour line results in multiple defect lines that form a contour. For a line focus laser, the defect may have a linear shape.

As used herein, the phrase "beam cross section" refers to the cross section of a laser beam along a plane perpendicular to a beam propagation direction of the laser beam, for example, along an X-Y plane when the beam propagation direction is in a Z direction.

As used herein, "beam spot" refers to a cross section of a laser beam (e.g., a beam cross section) in the impingement surface, i.e., the surface of a transparent workpiece in closest proximity to the laser optics.

As used herein, "impingement surface" refers to the surface of a transparent workpiece in closest proximity to the laser optics.

As used herein, "upstream" and "downstream" refer to the relative position of two locations or components along a beam pathway with respect to a beam source. For example, a first component is upstream from a second component if the first component is closer to the laser optics along the path traversed by the laser beam than the second component.

As used herein, "laser beam focal line," refers to pattern of interacting (e.g., crossing) light rays of a laser beam that form a linear, elongated focused region, parallel to an optical axis. The laser beam focal line comprises aberrated light rays that interact (e.g., cross) an optical axis of the laser beam at different positions along the optical axis. Furthermore, the laser beam focal lines described herein are formed using a quasi-non-diffracting beam, mathematically defined in detail below.

The phrase "transparent workpiece," as used herein, means a workpiece formed from glass, glass-ceramic or other material which is transparent, where the term "transparent," as used herein, means that the material has an optical absorption of less than 20% per mm of material depth, such as less than 10% per mm of material depth for the specified pulsed laser wavelength, or such as less than 1% per mm of material depth for the specified pulsed laser wavelength. Unless otherwise specified, the material has an optical absorption of less than about 20% per mm of material depth, The transparent workpiece may have a depth (e.g., thickness) of from about 50 microns (μm) to about 10 mm (such as from about 100 μm to about 5 mm, or from about 0.5 mm to about 3 mm. Transparent workpieces may comprise glass workpieces formed from glass compositions, such as borosilicate glass, soda-lime glass, aluminosilicate glass, alkali aluminosilicate, alkaline earth aluminosilicate glass, alkaline earth boro-aluminosilicate glass, fused silica, or crystalline materials such as sapphire, silicon, gallium arsenide, or combinations thereof. In some embodiments the transparent workpiece may be strengthened via thermal tempering before or after laser processing the transparent workpiece. In some embodiments, the glass may be ion-exchangeable, such that the glass composition can undergo ion-exchange for glass strengthening before or after laser processing the transparent workpiece. For example, the transparent workpiece may comprise ion exchanged and ion exchangeable glass, such as Corning Gorilla® Glass available from Corning Incorporated of Corning, N.Y. (e.g., code 2318, code 2319, and code 2320). Further, these ion exchanged glasses may have coefficients of thermal expansion (CTE) of from about 6 ppm/° C. to about 10 ppm/° C. Other example transparent workpieces may comprise EAGLE XG® and CORNING LOTUS™ available from Corning Incorporated of Corning, N.Y. Moreover, the transparent workpiece may comprise other components which are transparent to the wavelength of the laser, for example, crystals such as sapphire or zinc selenide.

In an ion exchange process, ions in a surface layer of the transparent workpiece are replaced by larger ions having the same valence or oxidation state, for example, by partially or fully submerging the transparent workpiece in an ion exchange bath. Replacing smaller ions with larger ions causes a layer of compressive stress to extend from one or more surfaces of the transparent workpiece to a certain depth within the transparent workpiece, referred to as the depth of layer. The compressive stresses are balanced by a layer of tensile stresses (referred to as central tension) such that the net stress in the glass sheet is zero. The formation of compressive stresses at the surface of the glass sheet makes the glass strong and resistant to mechanical damage and, as such, mitigates catastrophic failure of the glass sheet for flaws which do not extend through the depth of layer. In some embodiments, smaller sodium ions in the surface layer of the transparent workpiece are exchanged with larger potassium ions. In some embodiments, the ions in the surface layer and the larger ions are monovalent alkali metal cations, such as Li+ (when present in the glass), Na+, K+, Rb+, and Cs+. Alternatively, monovalent cations in the surface layer may be replaced with monovalent cations other than alkali metal cations, such as Ag+, Tl+, Cu+, or the like.

Figure 1B:
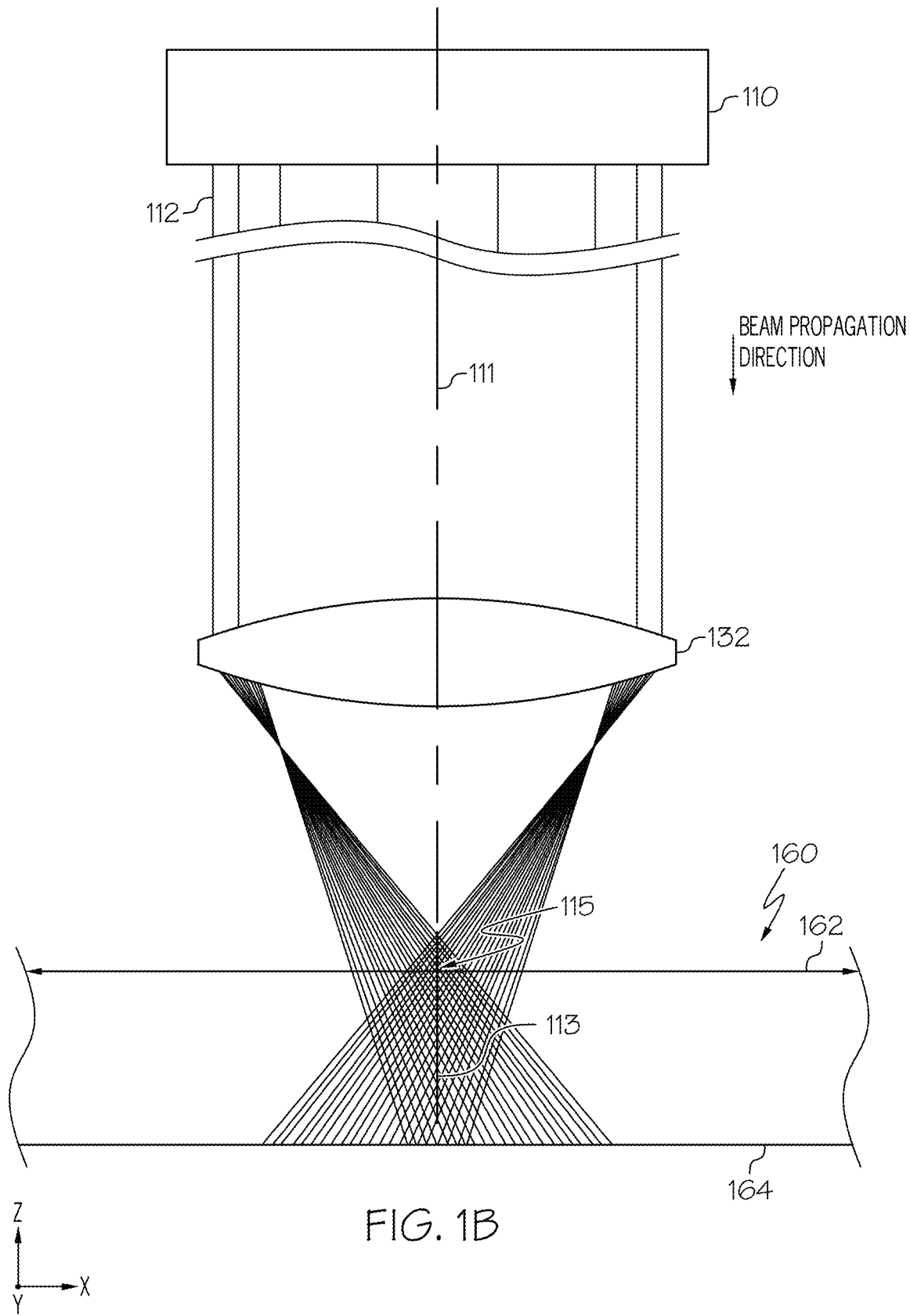
FIG. 1B schematically depicts the positioning of a laser beam focal line during formation of a contour of defects in a transparent workpiece, according to one or more embodiments described herein.

Referring now to FIGS. 1A and 1B, an example transparent workpiece 160 is schematically depicted undergoing laser processing according to the methods described herein. In particular, FIG. 1A schematically depicts the formation of a contour 170 comprising a plurality of defects 172, which may be used to separate the transparent workpieces 160. The contour 170 comprising the plurality of defects 172 may be formed by processing the transparent workpiece 160 with a defect forming laser beam 112, which may comprise an ultra-short pulsed laser beam moving in a translation direction 101 along a contour line 165. The defects 172 may extend, for example, through the depth of the transparent workpiece 160, and may be orthogonal to an impingement surface of the transparent workpiece 160. Further, the defect forming laser beam 112 initially contacts the transparent workpiece 160 at an impingement location 115, which is a specific location on the impingement surface. As depicted in FIGS. 1A and 1B, a first surface 162 of the transparent workpiece 160 comprises the impingement surface, however, it should be understood that in other embodiments, the defect forming laser beam 112 may instead initially irradiate a second surface 164 of the transparent workpiece 160. Furthermore, FIG. 1A depicts that the defect forming laser beam 112 forms a beam spot 114 projected onto the first surface 162 of the transparent workpiece 160.

FIGS. 1A and 1B depict the defect forming laser beam 112 propagating along a beam pathway 111 and oriented such that the defect forming laser beam 112 may be focused into a laser beam focal line 113 within the transparent workpiece 160, for example, using an aspheric optical element 120 (FIG. 2), for example, an axicon and one or more lenses (e.g., a first lens 130 and a second lens 132, as described below and depicted in FIG. 2). For example, the position of the laser beam focal line 113 may be controlled along the Z-axis and about the Z-axis. Further, the laser beam focal line 113 may have a length in a range of from about 0.1 mm to about 100 mm or in a range of from about 0.1 mm to about 10 mm. Various embodiments may be configured to have a laser beam focal line 113 with a length 1 of about 0.1 mm, about 0.2 mm, about 0.3 mm, about 0.4 mm, about 0.5 mm, about 0.7 mm, about 1 mm, about 2 mm, about 3 mm, about 4 mm, or about 5 mm e.g., from about 0.5 mm to about 5 mm. Further, the laser beam focal line 113 may be a portion of a quasi-non-diffracting beam, as defined in more detail below.

In operation, the defect forming laser beam 112 may be translated relative to the transparent workpiece 160 (e.g., in the translation direction 101) along the contour line 165 to form the plurality of defects 172 of the contour 170. Directing or localizing the defect forming laser beam 112 into the transparent workpiece 160 generates an induced absorption within the transparent workpiece 160 and deposits enough energy to break chemical bonds in the transparent workpiece 160 at spaced locations along the contour line 165 to form the defects 172. According to one or more embodiments, the defect forming laser beam 112 may be translated across the transparent workpiece 160 by motion of the transparent workpiece 160 (e.g., motion of a translation stage 190 coupled to the transparent workpiece 160, as shown in FIG. 2), motion of the defect forming laser beam 112 (e.g., motion of the laser beam focal line 113), or motion of both the transparent workpiece 160 and the laser beam focal line 113. By translating the laser beam focal line 113 relative to the transparent workpiece 160, the plurality of defects 172 may be formed in the transparent workpiece 160.

In some embodiments, the defects 172 may generally be spaced apart from one another by a distance along the contour 170 of from about 0.1 µm to about 500 µm, for example, about 1 µm to about 200 µm, about 2 µm to about 100 µm, about 5 µm to about 20 µm, or the like. For example, suitable spacing between the defects 172 may be from about 0.1 µm to about 50 µm, such as from about 5 µm to about 15 µm, from about 5 µm to about 12 µm, from about 7 µm to about 15 µm, or from about 7 µm to about 12 µm for the TFT/display glass compositions. In some embodiments, a spacing between adjacent defects 172 may be about 50 µm or less, 45 µm or less, 40 µm or less, 35 µm or less, 30 µm or less, 25 µm or less, 20 µm or less, 15 µm or less, 10 µm or less, or the like.

As illustrated in FIG. 1A, the plurality of defects 172 of the contour 170 extend into the transparent workpiece 160 and establish a path for crack propagation for separation of the transparent workpiece 160 into separate portions along the contour 170 (e.g., along the contour line 165), for example, using the optical assemblies 200, 200' of FIGS. 4A and 5A and the methods described below with reference to FIGS. 4A-6B. Forming the contour 170 comprises translating the defect forming laser beam 112 relative to the transparent workpiece 160 (e.g., in the translation direction 101) along the contour line 165 to form the plurality of defects 172 of the contour 170. According to one or more embodiments, the defect forming laser beam 112 may be translated across the transparent workpiece 160 by motion of the transparent workpiece 160, motion of the defect forming laser beam 112 (e.g., motion of the laser beam focal line 113), or motion of both the transparent workpiece 160 and the defect forming laser beam 112, for example, using one or more translation stages 190 (FIG. 2). By translating the laser beam focal line 113 relative to the transparent workpiece 160, the plurality of defects 172 may be formed in the transparent workpiece 160. Moreover, while the contour 170 illustrated in FIG. 1A is linear, the contour 170 may also be nonlinear (i.e., having a curvature). Curved contours may be produced, for example, by translating either the transparent workpiece 160 or laser beam focal line 113 with respect to the other in two dimensions instead of one dimension. For example, the contours 170 depicted in FIGS. 4, 5, 7A, and 7B each comprise a curved contour portion 272.

Referring again to FIGS. 1A and 1B, the defect forming laser beam 112 used to form the defects 172 further has an intensity distribution I(X,Y,Z), where Z is the beam propagation direction of the defect forming laser beam 112, and X and Y are directions orthogonal to the direction of propagation, as depicted in the figures. The X-direction and Y-direction may also be referred to as cross-sectional directions and the X-Y plane may be referred to as a cross-sectional plane. The intensity distribution of the defect forming laser beam 112 in a cross-sectional plane may be referred to as a cross-sectional intensity distribution.

The defect forming laser beam 112 at the beam spot 114 or other cross sections may comprise a quasi-non-diffracting beam, for example, a beam having low beam divergence as mathematically defined below, by propagating the defect forming laser beam 112 (e.g., the defect forming laser beam 112, such as a Gaussian beam, using a beam source 110, such as a pulsed beam source) through an aspheric optical element 120, as described in more detail below with respect to the optical assembly 100 depicted in FIG. 2. Beam divergence refers to the rate of enlargement of the beam cross section in the direction of beam propagation (i.e., the Z direction). One example beam cross section discussed herein is the beam spot 114 of the defect forming laser beam 112 projected onto the transparent workpiece 160. Example quasi non-diffracting beams include Gauss-Bessel beams and Bessel beams.

Diffraction is one factor that leads to divergence of defect forming laser beams 112. Other factors include focusing or defocusing caused by the optical systems forming the defect forming laser beams 112 or refraction and scattering at interfaces. Defect forming laser beams 112 for forming the defects 172 of the contours 170 may form laser beam focal lines 113 with low divergence and weak diffraction. The divergence of the defect forming laser beam 112 is characterized by the Rayleigh range $Z_R$, which is related to the variance $\sigma^2$ of the intensity distribution and beam propagation factor $M^2$ of the defect forming laser beam 112. In the discussion that follows, formulas will be presented using a Cartesian coordinate system. Corresponding expressions for other coordinate systems are obtainable using mathematical techniques known to those of skill in the art. Additional information on beam divergence can be found in the articles entitled "New Developments in Laser Resonators" by A. E. Siegman in SPIE Symposium Series Vol. 1224, p. 2 (1990) and "$M^2$ factor of Bessel-Gauss beams" by R. Borghi and M. Santarsiero in Optics Letters, Vol. 22(5), 262 (1997), the disclosures of which are incorporated herein by reference in their entirety. Additional information can also be found in the international standards ISO 11146-1:2005(E) entitled "Lasers and laser-related equipment—Test methods for laser beam widths, divergence angles and beam propagation ratios—Part 1: Stigmatic and simple astigmatic beams", ISO 11146-2:2005(E) entitled "Lasers and laser-related equipment—Test methods for laser beam widths, divergence angles and beam propagation ratios—Part 2: General astigmatic beams", and ISO 11146-3:2004(E) entitled "Lasers and laser-related equipment—Test methods for laser beam widths, divergence angles and beam propagation ratios—Part 3: Intrinsic and geometrical laser beam classification, propagation and details of test methods", the disclosures of which are incorporated herein by reference in their entirety.

The spatial coordinates of the centroid of the intensity profile of the defect forming laser beam 112 having a time-averaged intensity profile I(x, y, z) are given by the following expressions:

$$\bar{x}(z) = \frac{\int_{-\infty}^{\infty}\int_{-\infty}^{\infty} xI(x, y, z)dxdy}{\int_{-\infty}^{\infty}\int_{-\infty}^{\infty} I(x, y, z)dxdy} \quad (1)$$

$$\bar{y}(z) = \frac{\int_{-\infty}^{\infty}\int_{-\infty}^{\infty} yI(x, y, z)dxdy}{\int_{-\infty}^{\infty}\int_{-\infty}^{\infty} I(x, y, z)dxdy} \quad (2)$$

These are also known as the first moments of the Wigner distribution and are described in Section 3.5 of ISO 11146-2:2005(E). Their measurement is described in Section 7 of ISO 11146-2:2005(E).

Variance is a measure of the width, in the cross-sectional (X-Y) plane, of the intensity distribution of the defect forming laser beam 112 as a function of position z in the direction of beam propagation. For an arbitrary laser beam, variance in the X-direction may differ from variance in the Y-direction. We let $\sigma_x^2(z)$ and $\sigma_y^2(z)$ represent the variances in the X-direction and Y-direction, respectively. Of particular interest are the variances in the near field and far field limits. We let $\sigma_{0x}^2(z)$ and $\sigma_{0y}^2(z)$ represent variances in the X-direction and Y-direction, respectively, in the near field limit, and we let $\sigma_{\infty x}^2$ and $\sigma_{\infty x}^2(z)$ represent variances in the X-direction and Y-direction, respectively, in the far field limit. For a laser beam having a time-averaged intensity profile I(x,y,z) with Fourier transform $\tilde{I}(v_x, v_y)$ (where $v_x$ and $v_y$ are spatial frequencies in the X-direction and Y-direction, respectively), the near field and far field variances in the X-direction and Y-direction are given by the following expressions:

$$\sigma_{0x}^2(z) = \frac{\int_{-\infty}^{\infty}\int_{-\infty}^{\infty} x^2 I(x, y, z)dxdy}{\int_{-\infty}^{\infty}\int_{-\infty}^{\infty} I(x, y, z)dxdy} \quad (3)$$

$$\sigma_{0y}^2(z) = \frac{\int_{-\infty}^{\infty}\int_{-\infty}^{\infty} y^2 I(x, y, z)dxdy}{\int_{-\infty}^{\infty}\int_{-\infty}^{\infty} I(x, y, z)dxdy} \quad (4)$$

$$\sigma_{\infty x}^2 = \frac{\int_{-\infty}^{\infty}\int_{-\infty}^{\infty} v_x^2 \tilde{I}(v_x, v_y)dv_x dv_y}{\int_{-\infty}^{\infty}\int_{-\infty}^{\infty} \tilde{I}(v_x, v_y)dv_x dv_y} \quad (5)$$

$$\sigma_{\infty y}^2 = \frac{\int_{-\infty}^{\infty}\int_{-\infty}^{\infty} v_y^2 \tilde{I}(v_x, v_y)dv_x dv_y}{\int_{-\infty}^{\infty}\int_{-\infty}^{\infty} \tilde{I}(v_x, v_y)dv_x dv_y} \quad (6)$$

The variance quantities $\sigma_{0x}^2(z)$, $\sigma_{0y}^2(z)$, $\sigma_{\infty x}^2$, and $\sigma_{\infty y}^2$ are also known as the diagonal elements of the Wigner distribution (see ISO 11146-2:2005(E)). These variances can be quantified for an experimental laser beam using the measurement techniques described in Section 7 of ISO 11146-2:2005(E). In brief, the measurement uses a linear unsaturated pixelated detector to measure I(x,y) over a finite spatial region that approximates the infinite integration area of the integral equations which define the variances and the centroid coordinates. The appropriate extent of the measurement area, background subtraction and the detector pixel resolution are determined by the convergence of an iterative measurement procedure described in Section 7 of ISO 11146-2:2005(E). The numerical values of the expressions given by equations 1-6 are calculated numerically from the array of intensity values as measured by the pixelated detector.

Through the Fourier transform relationship between the transverse amplitude profile $\tilde{u}(x,y,z)$ for an arbitrary optical beam (where $I(x,y,z) \equiv |\tilde{u}(x,y,z)|^2$) and the spatial-frequency distribution $\tilde{P}(v_x, v_y, z)$ for an arbitrary optical beam (where $\tilde{I}(v_x, v_y) \equiv |\tilde{P}(v_x, v_y, z)|^2$), it can be shown that:

$$\sigma_x^2(z) = \sigma_{0x}^2(z_{0x}) + \lambda^2 \sigma_{\infty x}^2 (z-z_{0x})^2 \quad (7)$$

$$\sigma_y^2(z) = \sigma_{0y}^2(z_{0y}) + \lambda^2 \sigma_{\infty y}^2 (z-z_{0y})^2 \quad (8)$$

In equations (7) and (8), $\sigma_{0x}^2(z_{0x})$ and $\sigma_{0y}^2(z_{0y})$ are minimum values of $\sigma_{0x}^2(z)$ and $\sigma_{0y}^2(z)$, which occur at waist positions $z_{0x}$ and $z_{0y}$ in the x-direction and y-direction, respectively, and $\lambda$ is the wavelength of the defect forming laser beam 112. Equations (7) and (8) indicate that $\sigma_x^2(z)$ and $\sigma_y^2(z)$ increase quadratically with z in either direction from the minimum values associated with the waist position of the defect forming laser beam 112 (e.g., the waist portion of the laser beam focal line 113). Further, in the embodiments described herein comprising a beam spot 114 that is axisymmetric and thereby comprises an axisymmetric intensity distribution I(x,y), $\sigma_x^2(z) = \sigma_y^2(z)$ and in the embodiments described herein comprising a beam spot 114 that is non-axisymmetric and thereby comprises a non-axisymmetric intensity distribution I(x,y), $\sigma_x^2(z) \neq \sigma_y^2(z)$, i.e., $\sigma_x^2(z) < \sigma_y^2(z)$ or $\sigma_x^2(z) > \sigma_y^2(z)$.

Equations (7) and (8) can be rewritten in terms of a beam propagation factor $M^2$, where separate beam propagations factors $M_x^2$ and $M_y^2$ for the x-direction and the y-direction are defined as:

$$M_x^2 = 4\pi\sigma_{0x}\sigma_{\infty x} \quad (9)$$

$$M_y^2 = 4\pi\sigma_{0y}\sigma_{\infty y} \quad (10)$$

Rearrangement of Equations (9) and (10) and substitution into Equations (7) and (8) yields:

$$\sigma_x^2(z) = \sigma_{0x}^2(z_{0x}) + \frac{\lambda^2 M_x^4}{(4\pi\sigma_{0x})^2}(z - z_{0x})^2 \quad (11)$$

$$\sigma_y^2(z) = \sigma_{0y}^2(z_{0y}) + \frac{\lambda^2 M_y^4}{(4\pi\sigma_{0y})^2}(z - z_{0y})^2 \quad (12)$$

which can be rewritten as:

$$\sigma_x^2(z) = \sigma_{0x}^2(z_{0x})\left[1 + \frac{(z - z_{0x})^2}{Z_{Rx}^2}\right] \quad (13)$$

$$\sigma_y^2(z) = \sigma_{0y}^2(z_{0y})\left[1 + \frac{(z - z_{0y})^2}{Z_{Ry}^2}\right] \quad (14)$$

where the Rayleigh ranges $Z_{Rx}$ and $Z_{Ry}$ in the x-direction and y-direction, respectively, are given by:

$$Z_{Rx} = \frac{4\pi\sigma_{0x}^2}{M_x^2\lambda} \quad (15)$$

$$Z_{Ry} = \frac{4\pi\sigma_{0y}^2}{M_y^2\lambda} \quad (16)$$

The Rayleigh range corresponds to the distance (relative to the position of the beam waist as defined in Section 3.12 of ISO 11146-1:2005(E)) over which the variance of the laser beam doubles (relative to the variance at the position of the beam waist) and is a measure of the divergence of the cross sectional area of the laser beam. Further, in the embodiments described herein comprising a beam spot 114 that is axisymmetric and thereby comprises an axisymmetric intensity distribution I(x,y), $Z_{Rx}=Z_{Ry}$, and in the embodiments described herein comprising a beam spot 114 that is non-axisymmetric and thereby comprises a non-axisymmetric intensity distribution I(x,y), $Z_{Rx} \neq Z_{Ry}$, i.e., $Z_{Rx} < Z_{Ry}$ or $Z_{Rx} > Z_{Ry}$. The Rayleigh range can also be observed as the distance along the beam axis at which the optical intensity decays to one half of its value observed at the beam waist location (location of maximum intensity). Laser beams with large Rayleigh ranges have low divergence and expand more slowly with distance in the beam propagation direction than laser beams with small Rayleigh ranges.

The formulas above can be applied to any laser beam (not just Gaussian beams) by using the intensity profile I(x,y,z) that describes the laser beam. In the case of the $TEM_{00}$ mode of a Gaussian beam, the intensity profile is given by:

$$I(x, y) = \frac{\sqrt{\pi}}{2}w_o e^{\frac{-2(x^2+y^2)}{w_o^2}} \quad (17)$$

where $w_o$ is the radius (defined as the radius at which beam intensity decreases to $1/e^2$ of the peak beam intensity of the beam at a beam waist position $z_o$. From Equation (17) and the above formulas, we obtain the following results for a $TEM_{00}$ Gaussian beam:

$$\sigma_{0x}^2 = \sigma_{0y}^2 = \frac{w_o^2}{4} \quad (18)$$

$$\sigma_{\infty x}^2 = \sigma_{\infty y}^2 = \frac{1}{4\pi^2 w_o^2} \quad (19)$$

$$M_x^2 = 4\pi\sigma_{0x}\sigma_{\infty x} = 1 \quad (20)$$

$$M_y^2 = 4\pi\sigma_{0y}\sigma_{\infty y} = 1 \quad (21)$$

$$Z_{Rx} = \frac{4\pi\sigma_{0x}^2}{M_x^2\lambda} = \frac{\pi w_0^2}{\lambda} \quad (22)$$

$$Z_{Ry} = \frac{4\pi\sigma_{0y}^2}{M_y^2\lambda} = \frac{\pi w_0^2}{\lambda} \quad (23)$$

$$w^2(z) = w_0^2 + \frac{\lambda^2}{(\pi w_0)^2}(z - z_0)^2 = w_0^2\left[1 + \frac{(z - z_0)^2}{Z_R^2}\right] \quad (24)$$

where $Z_R = Z_{Rx} = Z_{Ry}$. For Gaussian beams, it is further noted that $M^2 = M_x^2 = M_y^2 = 1$.

Beam cross section is characterized by shape and dimensions. The dimensions of the beam cross section are characterized by a spot size of the beam. For a Gaussian beam, spot size is frequently defined as the radial extent at which the intensity of the beam decreases to $1/e^2$ of its maximum value, denoted in Equation (17) as $w_0$. The maximum intensity of a Gaussian beam occurs at the center (x=0 and y=0 (Cartesian) or r=0 (cylindrical)) of the intensity distribution and radial extent used to determine spot size is measured relative to the center.

Beams with axisymmetric (i.e. rotationally symmetric around the beam propagation axis Z) cross sections can be characterized by a single dimension or spot size that is measured at the beam waist location as specified in Section 3.12 of ISO 11146-1:2005(E). For a Gaussian beam, Equation (17) shows that spot size is equal to $w_o$, which from Equation (18) corresponds to $2\sigma_{0x}$ or $2\sigma_{0y}$. For an axisymmetric beam having an axisymmetric cross section, such as a circular cross section, $\sigma_{0x} = \sigma_{0y}$. Thus, for axisymmetric beams, the cross section dimension may be characterized with a single spot size parameter, where $w_o = 2\sigma_0$. Spot size can be similarly defined for non-axisymmetric beam cross sections where, unlike an axisymmetric beam, $\sigma_{0x} \neq \sigma_{0y}$. Thus, when the spot size of the beam is non-axisymmetric, it is necessary to characterize the cross-sectional dimensions of a non-axisymmetric beam with two spot size parameters: $w_{ox}$ and $w_{oy}$ in the x-direction and y-direction, respectively, where $$w_{ox} = 2\sigma_{0x} \quad (25)$$

$$w_{oy} = 2\sigma_{0y} \quad (26)$$

Further, the lack of axial (i.e. arbitrary rotation angle) symmetry for a non-axisymmetric beam means that the results of a calculation of values of $\sigma_{0x}$ and $\sigma_{0y}$ will depend on the choice of orientation of the X-axis and Y-axis. ISO 11146-1:2005(E) refers to these reference axes as the principal axes of the power density distribution (Section 3.3-3.5) and in the following discussion we will assume that the X and Y axes are aligned with these principal axes. Further, an angle φ about which the X-axis and Y-axis may be rotated in the cross-sectional plane (e.g., an angle of the X-axis and Y-axis relative to reference positions for the X-axis and Y-axis, respectively) may be used to define minimum ($w_{o,min}$) and maximum values ($w_{o,max}$) of the spot size parameters for a non-axisymmetric beam:

$$w_{o,min} = 2\sigma_{0,min} \quad (27)$$

$$w_{o,max} = 2\sigma_{0,max} \quad (28)$$

where $2\sigma_{0,min} = 2\sigma_{0x}(\phi_{min,x}) = 2\sigma_{0y}(\phi_{min,y})$ and $2\sigma_{0,max} = 2\sigma_{0x}(\phi_{max,x}) = 2\sigma_{0y}(\phi_{max,y})$. The magnitude of the axial asymmetry of the beam cross section can be quantified by the aspect ratio, where the aspect ratio is defined as the ratio of $w_{o,max}$ to $w_{o,min}$. An axisymmetric beam cross section has an aspect ratio of 1.0, while elliptical and other non-axisymmetric beam cross sections have aspect ratios greater than 1.0, for example, greater than 1.1, greater than 1.2, greater than 1.3, greater than 1.4, greater than 1.5, greater than 1.6, greater than 1.7, greater than 1.8, greater than 1.9, greater than 2.0, greater than 3.0, greater than 5.0, greater than 10.0, or the like To promote uniformity of defects 172 in the beam propagation direction (e.g. depth dimension of the transparent workpiece 160), a defect forming laser beam 112 having low divergence may be used. In one or more embodiments, defect forming laser beams 112 having low divergence may be utilized for forming defects 172. As noted above, divergence can be characterized by the Rayleigh range. For non-axisymmetric beams, Rayleigh ranges for the principal axes X and Y are defined by Equations (15) and (16) for the X-direction and Y-direction, respectively, where it can be shown that for any real beam, $M_x^2 > 1$ and $M_y^2 > 1$ and where $\sigma_{0x}^2$ and $\sigma_{0y}^2$ are determined by the intensity distribution of the laser beam. For symmetric beams, Rayleigh range is the same in the X-direction and Y-direction and is expressed by Equation (22) or Equation (23). Low divergence correlates with large values of the Rayleigh range and weak diffraction of the laser beam.

Beams with Gaussian intensity profiles may be less preferred for laser processing to form defects 172 because, when focused to small enough spot sizes (such as spot sizes in the range of microns, such as about 1-5 µm or about 1-10 µm) to enable available laser pulse energies to modify materials such as glass, they are highly diffracting and diverge significantly over short propagation distances. To achieve low divergence, it is desirable to control or optimize the intensity distribution of the pulsed laser beam to reduce diffraction. Pulsed laser beams may be non-diffracting or weakly diffracting. Weakly diffracting laser beams include quasi-non-diffracting laser beams. Representative weakly diffracting laser beams include Bessel beams, Gauss-Bessel beams, Airy beams, Weber beams, and Mathieu beams.

For non-axisymmetric beams, the Rayleigh ranges $Z_{Rx}$ and $Z_{Ry}$ are unequal. Equations (15) and (16) indicate that $Z_{Rx}$ and $Z_{Ry}$ depend on $\sigma_{0x}$ and $\sigma_{0y}$, respectively, and above we noted that the values of $\sigma_{0x}$ and $\sigma_{0y}$ depend on the orientation of the X-axis and Y-axis. The values of $Z_{Rx}$ and $Z_{Ry}$ will accordingly vary, and each will have a minimum value and a maximum value that correspond to the principal axes, with the minimum value of $Z_{Rx}$ being denoted as $Z_{Rx,min}$ and the minimum value of of $Z_{Ry}$ being denoted $Z_{Ry,min}$ for an arbitrary beam profile $Z_{Rx,min}$ and $Z_{Ry}$,min can be shown to be given by $$Z_{Rx,min} = \frac{4\pi\sigma_{0,min}^2}{M_x^2 \lambda} \text{ and} \quad (29)$$

$$Z_{Ry,min} = \frac{4\pi\sigma_{0,min}^2}{M_y^2 \lambda} \quad (30)$$

Since divergence of the laser beam occurs over a shorter distance in the direction having the smallest Rayleigh range, the intensity distribution of the defect forming laser beam 112 used to form defects 172 may be controlled so that the minimum values of $Z_{Rx}$ and $Z_{Ry}$ (or for axisymmetric beams, the value of $Z_R$) are as large as possible. Since the minimum value $Z_{Rx,min}$ of $Z_{Rx}$ and the minimum value $Z_{Ry}$,min of $Z_{Ry}$ differ for a non-axisymmetric beam, a defect forming laser beam 112 may be used with an intensity distribution that makes the smaller of $Z_{Rx,min}$ and $Z_{Ry,min}$ as large as possible when forming damage regions.

In different embodiments, the smaller of $Z_{Rx,min}$ and $Z_{Ry,min}$ (or for axisymmetric beams, the value of $Z_R$) is greater than or equal to 50 µm, greater than or equal to 100 µm, greater than or equal to 200 µm, greater than or equal to 300 µm, greater than or equal to 500 µm, greater than or equal to 1 mm, greater than or equal to 2 mm, greater than or equal to 3 mm, greater than or equal to 5 mm, in the range from 50 µm to 10 mm, in the range from 100 µm to 5 mm, in the range from 200 µm to 4 mm, in the range from 300 µm to 2 mm, or the like.

The values and ranges for the smaller of $Z_{Rx,min}$ and $Z_{Ry,min}$ (or for axisymmetric beams, the value of $Z_R$) specified herein are achievable for different wavelengths to which the workpiece is transparent through adjustment of the spot size parameter $w_{o,min}$ defined in Equation (27). In different embodiments, the spot size parameter $w_{o,min}$ is greater than or equal to 0.25 µm, greater than or equal to 0.50 µm, greater than or equal to 0.75 µm, greater than or equal to 1.0 µm, greater than or equal to 2.0 µm, greater than or equal to 3.0 µm, greater than or equal to 5.0 µm, in the range from 0.25 µm to 10 µm, in the range from 0.25 µm to 5.0 µm, in the range from 0.25 µm to 2.5 µm, in the range from 0.50 µm to 10 µm, in the range from 0.50 µm to 5.0 µm, in the range from 0.50 µm to 2.5 µm, in the range from 0.75 µm to 10 µm, in the range from 0.75 µm to 5.0 µm, in the range from 0.75 µm to 2.5 µm, or the like.

Non-diffracting or quasi non-diffracting beams generally have complicated intensity profiles, such as those that decrease non-monotonically vs. radius. By analogy to a Gaussian beam, an effective spot size $w_{o,eff}$ can be defined for non-axisymmetric beams as the shortest radial distance, in any direction, from the radial position of the maximum intensity (r=0) at which the intensity decreases to $1/e^2$ of the maximum intensity. Further, for axisymmetric beams $w_{o,eff}$ is the radial distance from the radial position of the maximum intensity (r=0) at which the intensity decreases to $1/e^2$ of the maximum intensity. A criterion for Rayleigh range based on the effective spot size $w_{o,eff}$ for non-axisymmetric beams or the spot size $w_o$ for axisymmetric beams can be specified as non-diffracting or quasi non-diffracting beams for forming damage regions using equation (31) for non-axisymmetric beams of equation (32) for axisymmetric beams, below:

$$\text{Smaller of } Z_{Rx,min}, Z_{Ry,min} > F_D \frac{\pi w_{0,eff}^2}{\lambda} \quad (31)$$

$$Z_R > F_D \frac{\pi w_0^2}{\lambda} \quad (32)$$

where $F_D$ is a dimensionless divergence factor having a value of at least 10, at least 50, at least 100, at least 250, at least 500, at least 1000, in the range from 10 to 2000, in the range from 50 to 1500, in the range from 100 to 1000. By comparing Equation (31) to Equation (22) or (23), one can see that for a non-diffracting or quasi non-diffracting beam the distance, Smaller of $Z_{Rx,min}$, $Z_{Ry,min}$ in Equation (31), over which the effective beam size doubles, is $F_D$ times the distance expected if a typical Gaussian beam profile were used. The dimensionless divergence factor $F_D$ provides a criterion for determining whether or not a laser beam is quasi-non-diffracting. As used herein, the defect forming laser beam 112 is considered quasi-non-diffracting if the characteristics of the laser beam satisfy Equation (31) or Equation (32) with a value of $F_D \geq 10$. As the value of $F_D$ increases, the defect forming laser beam 112 approaches a more nearly perfect non-diffracting state. Moreover, it should be understood that Equation (32) is merely a simplification of Equation (31) and as such, Equation (31) mathematically describes the dimensionless divergence factor $F_D$ for both axisymmetric and non-axisymmetric defect forming laser beams 112.

Figure 2:
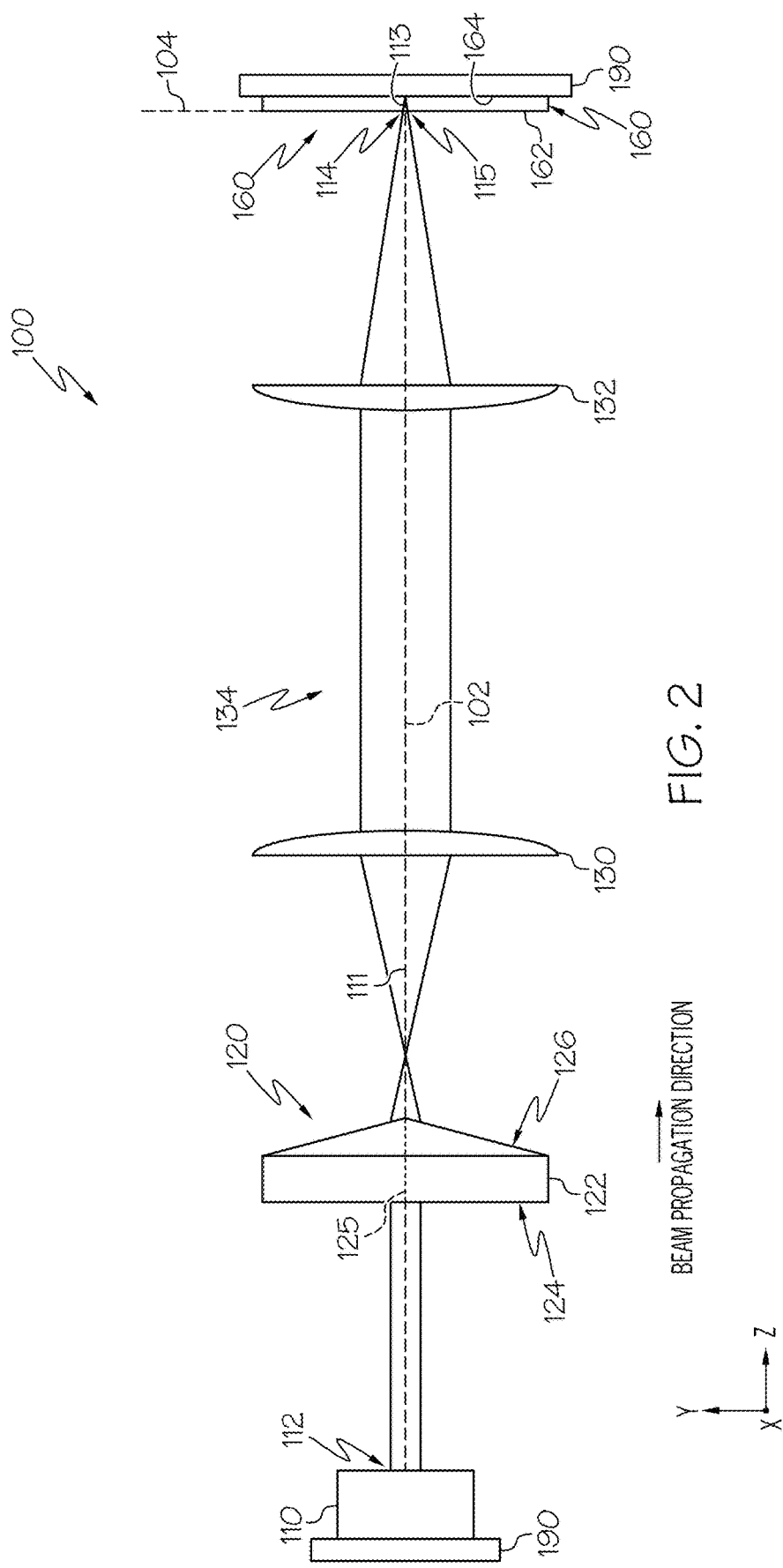
FIG. 2 schematically depicts an optical assembly for forming a contour of defects in a transparent workpiece, according to one or more embodiments described herein.

Referring now to FIG. 2, an optical assembly 100 for producing a defect forming laser beam 112 that that is quasi-non-diffracting and forms the laser beam focal line 113 at the transparent workpiece 160 using the aspheric optical element 120 (e.g., an axicon 122) is schematically depicted. The optical assembly 100 includes a beam source 110 that outputs the defect forming laser beam 112, first lens 130 and second lens 132. The beam source 110 may comprise any known or yet to be developed beam source 110 configured to output defect forming laser beams 112, for example, pulsed laser beams or continuous wave laser beams.

In some embodiments, the beam source 110 may output a defect forming laser beam 112 comprising a wavelength of for example, 1064 nm, 1030 nm, 532 nm, 530 nm, 355 nm, 343 nm, or 266 nm, or 215 nm. Further, the defect forming laser beam 112 used to form defects 172 in the transparent workpiece 160 may be well suited for materials that are transparent to the selected pulsed laser wavelength.

Further, the transparent workpiece 160 may be positioned such that the defect forming laser beam 112 output by the beam source 110 irradiates the transparent workpiece 160, for example, after traversing the aspheric optical element 120 and thereafter, both the first lens 130 and the second lens 132. An optical axis 102 extends between the beam source 110 and the transparent workpiece 160 (along the Z-axis in the embodiment depicted in FIG. 2) such that when the beam source 110 outputs the defect forming laser beam 112, the beam pathway 111 of the defect forming laser beam 112 extends along the optical axis 102.

Suitable laser wavelengths for forming defects 172 are wavelengths at which the combined losses of linear absorption and scattering by the transparent workpiece 160 are sufficiently low. In embodiments, the combined losses due to linear absorption and scattering by the transparent workpiece 160 at the wavelength are less than 20%/mm, or less than 15%/mm, or less than 10%/mm, or less than 5%/mm, or less than 1%/mm, where the dimension "/mm" means per millimeter of distance within the transparent workpiece 160 in the beam propagation direction of the defect forming laser beam 112 (e.g., the Z direction).

Representative wavelengths for many glass workpieces include fundamental and harmonic wavelengths of $Nd^{3+}$ (e.g. $Nd^{3+}$:YAG or $Nd^{3+}$:YVO$_4$ having fundamental wavelength near 1064 nm and higher order harmonic wavelengths near 532 nm, 355 nm, and 266 nm). Other wavelengths in the ultraviolet, visible, and infrared portions of the spectrum that satisfy the combined linear absorption and scattering loss requirement for a given substrate material can also be used.

In operation, the defect forming laser beam 112 output by the beam source 110 may create multi-photon absorption (MPA) in the transparent workpiece 160. MPA is the simultaneous absorption of two or more photons of identical or different frequencies that excites a molecule from one state (usually the ground state) to a higher energy electronic state (i.e., ionization). The energy difference between the involved lower and upper states of the molecule is equal to the sum of the energies of the involved photons. MPA, also called induced absorption, can be a second-order or third-order process (or higher order), for example, that is several orders of magnitude weaker than linear absorption. It differs from linear absorption in that the strength of second-order induced absorption may be proportional to the square of the light intensity, for example, and thus it is a nonlinear optical process.

The perforation step that creates the contour 170 (FIGS. 1A and 1B) may utilize the beam source 110 (e.g., a pulsed beam source such as an ultra-short pulse laser) in combination with the aspheric optical element 120, the first lens 130, and the second lens 132, to irradiate the transparent workpiece 160 and generate the laser beam focal line 113. The laser beam focal line 113 comprises a quasi-non-diffracting beam, such as a Gauss-Bessel beam or Bessel beam, as defined above, and may fully or partially perforate the transparent workpiece 160 to form defects 172 in the transparent workpiece 160, which may form the contour 170. In embodiments in which the defect forming laser beam 112 comprises a pulsed laser beam, the pulse duration of the individual pulses is in a range of from about 1 femtosecond to about 200 picoseconds, such as from about 1 picosecond to about 100 picoseconds, 5 picoseconds to about 20 picoseconds, or the like, and the repetition rate of the individual pulses may be in a range from about 1 kHz to 4 MHz, such as in a range from about 10 kHz to about 3 MHz, or from about 10 kHz to about 650 kHz.

Figure 3:
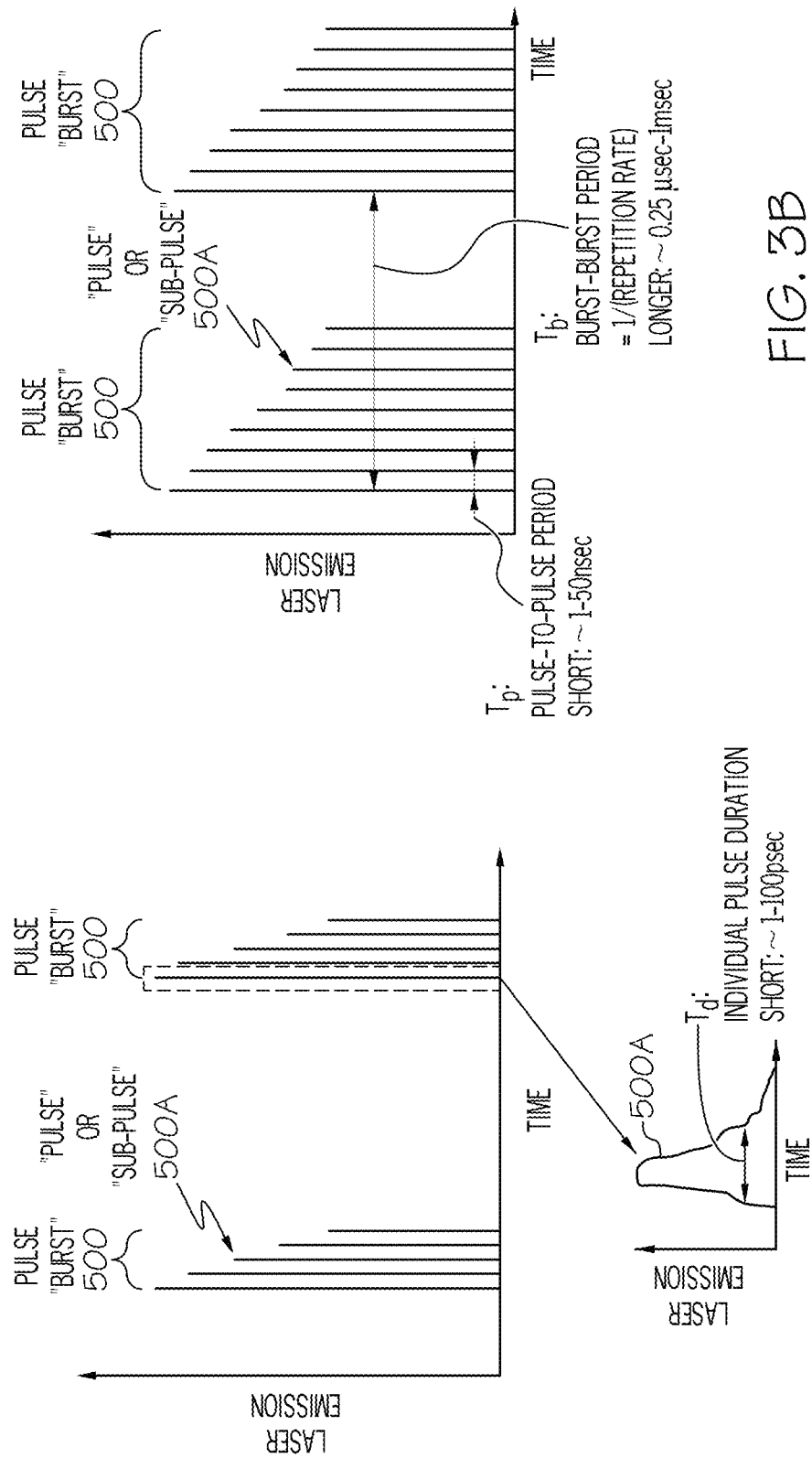
FIG. 3A graphically depicts the relative intensity of laser pulses within an exemplary pulse burst vs. time, according to one or more embodiments described herein.
FIG. 3B graphically depicts relative intensity of laser pulses vs. time within another exemplary pulse burst, according to one or more embodiments described herein.

Referring also to FIGS. 3A and 3B, in addition to a single pulse operation at the aforementioned individual pulse repetition rates, in embodiments comprising a pulsed laser beam, the pulses may be produced in pulse bursts 500 of two sub-pulses 500A or more (such as, for example, 3 sub-pulses, 4 sub-pulses, 5 sub-pulses, 10 sub-pulses, 15 sub-pulses, 20 sub-pulses, or more per pulse burst, such as from 1 to 30 sub-pulses per pulse burst 500, or from 5 to 20 sub-pulses per pulse burst 500). While not intending to be limited by theory, a pulse burst is a short and fast grouping of sub-pulses that creates an optical energy interaction with the material (i.e. MPA in the material of the transparent workpiece 160) on a time scale not easily accessible using a single-pulse operation. While still not intending to be limited by theory, the energy within a pulse burst (i.e. a group of pulses) is conserved. As an illustrative example, for a pulse burst having an energy of 100 μJ/burst and 2 sub-pulses, the 100 μJ/burst energy is split between the 2 pulses for an average energy of 50 μJ per sub-pulse and for a pulse burst having an energy of 100 μJ/burst and 10 sub-pulses, the 100 μJ/burst is split amongst the 10 sub-pulses for an average energy of 10 μJ per sub-pulse. Further, the energy distribution among the sub-pulses of a pulse burst does not need to be uniform. In fact, in some instances, the energy distribution among the sub-pulses of a pulse burst is in the form of an exponential decay, where the first sub-pulse of the pulse burst contains the most energy, the second sub-pulse of the pulse burst contains slightly less energy, the third sub-pulse of the pulse burst contains even less energy, and so on. However, other energy distributions within an individual pulse burst are also possible, where the exact energy of each sub-pulse can be tailored to effect different amounts of modification to the transparent workpiece 160.

While still not intending to be limited by theory, when the defects 172 of the one or more contours 170 are formed with pulse bursts having at least two sub-pulses, the force necessary to separate the transparent workpiece 160 along the contour 170 (i.e. the maximum break resistance) is reduced compared to the maximum break resistance of a contour 170 with the same spacing between adjacent defects 172 in an identical transparent workpiece 160 that is formed using a single pulse laser. For example, the maximum break resistance of a contour 170 formed using a single pulse is at least two times greater than the maximum break resistance of a contour 170 formed using a pulse burst having 2 or more sub-pulses. Further, the difference in maximum break resistance between a contour 170 formed using a single pulse and a contour 170 formed using a pulse burst having 2 sub-pulses is greater than the difference in maximum break resistance between a contour 170 formed using a pulse burst having 2 sub-pulses and a pulse burst having 3 sub-pulses. Thus, pulse bursts may be used to form contours 170 that separate easier than contours 170 formed using a single pulse laser.

Referring still to FIGS. 3A and 3B, the sub-pulses 500A within the pulse burst 500 may be separated by a duration that is in a range from about 1 nsec to about 50 nsec, for example, from about 10 nsec to about 30 nsec, such as about 20 nsec. In other embodiments, the sub-pulses 500A within the pulse burst 500 may be separated by a duration of up to 100 psec (for example, 0.1 psec, 5 psec, 10 psec, 15 psec, 18 psec, 20 psec, 22 psec, 25 psec, 30 psec, 50 psec, 75 psec, or any range therebetween). For a given laser, the time separation $T_p$ (FIG. 4B) between adjacent sub-pulses 500A within a pulse burst 500 may be relatively uniform (e.g., within about 10% of one another). For example, in some embodiments, each sub-pulse 500A within a pulse burst 500 is separated in time from the subsequent sub-pulse by approximately 20 nsec (50 MHz). Further, the time between each pulse burst 500 may be from about 0.25 microseconds to about 1000 microseconds, e.g., from about 1 microsecond to about 10 microseconds, or from about 3 microseconds to about 8 microseconds.

In some of the exemplary embodiments of the beam source 110 described herein, the time separation $T_b$ (FIG. 3B) is about 5 microseconds for the beam source 110 outputting a defect forming laser beam 112 comprising a burst repetition rate of about 200 kHz. The laser burst repetition rate is related to the time $T_b$ between the first pulse in a burst to the first pulse in the subsequent burst (laser burst repetition rate=$1/T_b$). In some embodiments, the laser burst repetition rate may be in a range of from about 1 kHz to about 4 MHz. In embodiments, the laser burst repetition rates may be, for example, in a range of from about 10 kHz to 650 kHz. The time $T_b$ between the first pulse in each burst to the first pulse in the subsequent burst may be from about 0.25 microsecond (4 MHz burst repetition rate) to about 1000 microseconds (1 kHz burst repetition rate), for example from about 0.5 microseconds (2 MHz burst repetition rate) to about 40 microseconds (25 kHz burst repetition rate), or from about 2 microseconds (500 kHz burst repetition rate) to about 20 microseconds (50 k Hz burst repetition rate). The exact timing, pulse duration, and burst repetition rate may vary depending on the laser design, but short pulses ($T_d$<20 psec and, in some embodiments, $T_d$ 15 psec) of high intensity have been shown to work particularly well.

The burst repetition rate may be in a range of from about 1 kHz to about 2 MHz, such as from about 1 kHz to about 200 kHz. Bursting or producing pulse bursts 500 is a type of laser operation where the emission of sub-pulses 500A is not in a uniform and steady stream but rather in tight clusters of pulse bursts 500. The pulse burst laser beam may have a wavelength selected based on the material of the transparent workpiece 160 being operated on such that the material of the transparent workpiece 160 is substantially transparent at the wavelength. The average laser power per burst measured at the material may be at least about 40 µJ per mm of thickness of material. For example, in embodiments, the average laser power per burst may be from about 40 µJ/mm to about 2500 µJ/mm, or from about 500 µJ/mm to about 2250 µJ/mm. In a specific example, for 0.5 mm to 0.7 mm thick Corning EAGLE XG® transparent workpiece, pulse bursts of from about 300 NJ to about 600 µJ may cut and/or separate the workpiece, which corresponds to an exemplary range of about 428 J/mm to about 1200 µJ/mm (i.e., 300 µJ/0.7 mm for 0.7 mm EAGLE XG® glass and 600 µJ/0.5 mm for a 0.5 mm EAGLE XG® glass).

The energy required to modify the transparent workpiece 160 is the pulse energy, which may be described in terms of pules burst energy (i.e., the energy contained within a pulse burst 500 where each pulse burst 500 contains a series of sub-pulses 500A), or in terms of the energy contained within a single laser pulse (many of which may comprise a burst). The pulse energy (for example, pulse burst energy) may be from about 25 µJ to about 750 µJ, e.g., from about 50 µJ to about 500 µJ, or from about 50 µJ to about 250 J. For some glass compositions, the pulse energy (e.g., pulse burst energy) may be from about 100 µJ to about 250 J. However, for display or TFT glass compositions, the pulse energy (e.g., pulse burst energy) may be higher (e.g., from about 300 µJ to about 500 µJ, or from about 400 µJ to about 600 µJ, depending on the specific glass composition of the transparent workpiece 160).

While not intending to be limited by theory, the use of a defect forming laser beam 112 comprising a pulsed laser beam capable of generating pulse bursts is advantageous for cutting or modifying transparent materials, for example glass (e.g., the transparent workpiece 160). In contrast with the use of single pulses spaced apart in time by the repetition rate of the single-pulsed laser, the use of a burst sequence that spreads the pulse energy over a rapid sequence of pulses within the burst allows access to larger timescales of high intensity interaction with the material than is possible with single-pulse lasers. The use of pulse bursts (as opposed to a single pulse operation) increases the size (e.g., the cross-sectional size) of the defects 172, which facilitates the connection of adjacent defects 172 when separating transparent workpiece 160 along the one or more contours 170, thereby minimizing unintended crack formation. Further, using a pulse burst to form defects 172 increases the randomness of the orientation of cracks extending outward from each defect 172 into the bulk material of the transparent workpiece 160 such that individual cracks extending outward from defects 172 do not influence or otherwise bias the separation of the contour 170 such that separation of the defects 172 follows the contour 170, minimizing the formation of unintended cracks.

Referring again to FIG. 2, the aspheric optical element 120 is positioned within the beam pathway 111 between the beam source 110 and the transparent workpiece 160. In operation, propagating the defect forming laser beam 112, e.g., an incoming Gaussian beam, through the aspheric optical element 120 may alter the defect forming laser beam 112 such that the portion of the defect forming laser beam 112 propagating beyond the aspheric optical element 120 is quasi-non-diffracting, as described above. The aspheric optical element 120 may comprise any optical element comprising an aspherical shape. In some embodiments, the aspheric optical element 120 may comprise a conical wavefront producing optical element, such as an axicon lens, for example, a negative refractive axicon lens, a positive refractive axicon lens, a reflective axicon lens, a diffractive axicon lens, a programmable spatial light modulator axicon lens (e.g., a phase axicon), or the like.

In some embodiments, the aspheric optical element 120 comprises at least one aspheric surface whose shape is mathematically described as: $z'=(cr^2/1)+(1-(1+k)(c^2r^2))^{1/2}+(a_1r+a_2r^2+a_3r^3+a_4r^4+a_5r^5+a_6r^6+a_7r^7+a_8r^8+a_9r^9+a_{10}r^{10}+a_{11}r^{11}+a_{12}r^{12}$ where z' is the surface sag of the aspheric surface, r is the distance between the aspheric surface and the optical axis 102 in a radial direction (e.g., in an X-direction or a Y-direction), c is the surface curvature of the aspheric surface (i.e. $c_i=1/R_i$, where R is the surface radius of the aspheric surface), k is the conic constant, and coefficients $a_i$ are the first through the twelfth order aspheric coefficients or higher order aspheric coefficients (polynomial aspheres) describing the aspheric surface. In one example embodiment, at least one aspheric surface of the aspheric optical element 120 includes the following coefficients $a_1$-$a_7$, respectively: −0.085274788; 0.065748845; 0.077574995; −0.054148636; 0.022077021; −0.0054987472; 0.0006682955; and the aspheric coefficients $a_8$-$a_{12}$ are 0. In this embodiment, the at least one aspheric surface has the conic constant k=0. However, because the $a_1$ coefficient has a nonzero value, this is equivalent to having a conic constant k with a non-zero value. Accordingly, an equivalent surface may be described by specifying a conic constant k that is non zero, a coefficient $a_1$ that is non-zero, or a combination of a nonzero k and a non-zero coefficient $a_1$. Further, in some embodiments, the at least one aspheric surface is described or defined by at least one higher order aspheric coefficients $a_2$-$a_{12}$ with non-zero value (i.e., at least one of $a_2, a_3 \ldots, a_{12} \neq 0$). In one example embodiment, the aspheric optical element 120 comprises a third-order aspheric optical element such as a cubically shaped optical element, which comprises a coefficient $a_3$ that is non-zero.

In some embodiments, when the aspheric optical element 120 comprises an axicon 122 (as depicted in FIG. 2), the axicon 122 may have a laser output surface 126 (e.g., conical surface) having an angle of about 1.2°, such as from about 0.5° to about 5°, or from about 1° to about 1.5°, or even from about 0.5° to about 20°, the angle measured relative to the laser input surface 124 (e.g., flat surface) upon which the defect forming laser beam 112 enters the axicon 122. Further, the laser output surface 126 terminates at a conical tip. Moreover, the aspheric optical element 120 includes a centerline axis 125 extending from the laser input surface 124 to the laser output surface 126 and terminating at the conical tip. In other embodiments, the aspheric optical element 120 may comprise a waxicon, a spatial phase modulator such as a spatial light modulator, or a diffractive optical grating. In operation, the aspheric optical element 120 shapes the incoming defect forming laser beam 112 (e.g., an incoming Gaussian beam) into a quasi-non-diffracting beam, which, in turn, is directed through the first lens 130 and the second lens 132.

Referring still to FIG. 2, the first lens 130 is positioned upstream the second lens 132 and may collimate the defect forming laser beam 112 within a collimation space 134 between the first lens 130 and the second lens 132. Further, the second lens 132 may focus the defect forming laser beam 112 into the transparent workpiece 160, which may be positioned at an imaging plane 104. In some embodiments, the first lens 130 and the second lens 132 each comprise plano-convex lenses. When the first lens 130 and the second lens 132 each comprise plano-convex lenses, the curvature of the first lens 130 and the second lens 132 may each be oriented toward the collimation space 134. In other embodiments, the first lens 130 may comprise other collimating lenses and the second lens 132 may comprise a meniscus lens, an asphere, or another higher-order corrected focusing lens.

Figure 4:
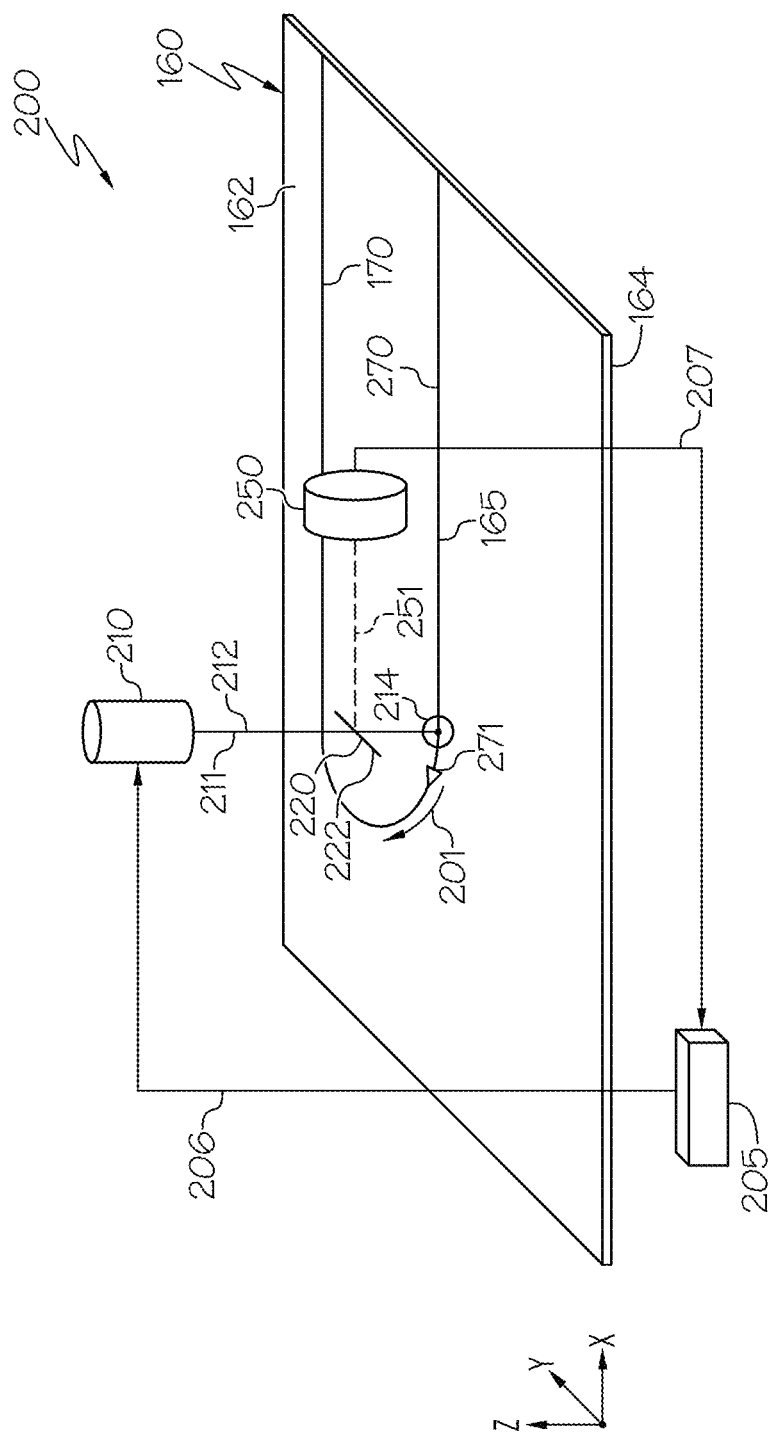
FIG. 4 schematically depicts an example optical assembly for separating a transparent workpiece having a contour of defects, according to one or more embodiments shown and described herein.
Figure 5:
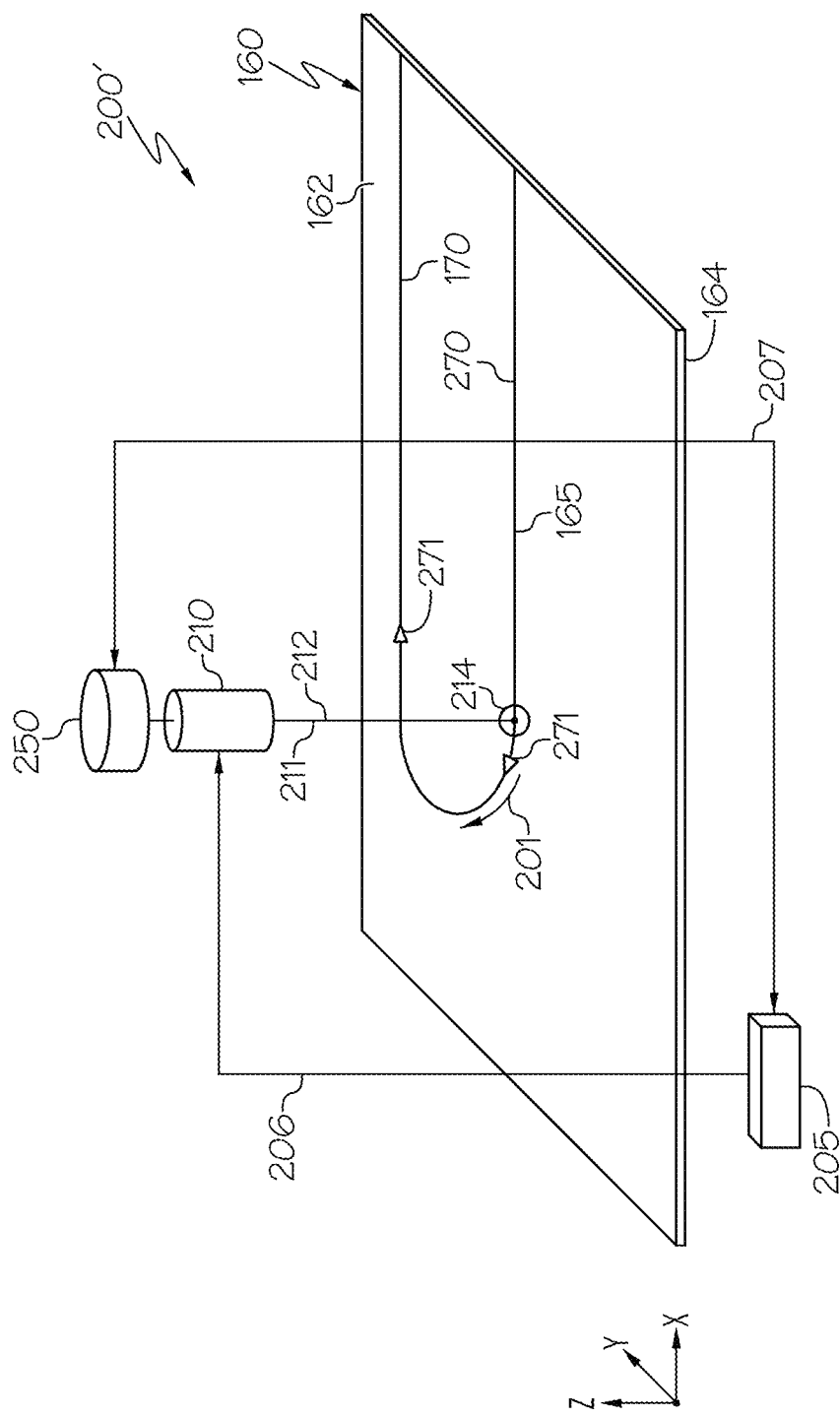
FIG. 5 schematically depicts another example optical assembly for separating a transparent workpiece having a contour of defects, according to one or more embodiments shown and described herein.

Referring now to FIGS. 4 and 5, in some embodiments, the transparent workpiece 160 may be further acted upon in a subsequent separating step to induce separation of the transparent workpiece 160 along the contour 170 (and along the contour line 165), which may comprise a curved contour portion 272. For example, FIGS. 4 and 5 depict optical assemblies 200, 200' for separating the transparent workpiece 160 along the contour 170 by using an infrared laser beam 212 to create thermal stress along the contour 170, inducing formation of a crack 270 along the contour 170 to separate the transparent workpiece 160. Optical assemblies 200, 200' each comprise an infrared beam source 210 that outputs the infrared laser beam 212, an imaging system 250, a process controller 205 and optionally, a beam steering apparatus 220 (FIG. 4). The process controller 205 may comprise a computer or any other computing device, such as a stand-alone control interface. The infrared laser beam 212 may be communicatively coupled to and controlled by the process controller 205 through control line 206 and the imaging system 250 may be communicatively coupled to and controlled by the process controller 205 through control line 207.

In the optical assembly 200 of FIG. 4, the imaging system 250 and the infrared beam source 210 are non-axially positioned and in the optical assembly 200' of FIG. 5, the imaging system 250 and the infrared beam source 210 are coaxially positioned, forming an in-line system. Further, the infrared beam source 210, the beam steering apparatus 220, and/or the imaging system 250 may be translatable relative to the transparent workpiece 160, for example by using translation stages, transition arms, or the like. While the optical assembly 100 of FIG. 3 for forming the contour 170 in the transparent workpiece 160 is depicted separate from the optical assemblies 200, 200' of FIGS. 4 and 5, it should be understood that the components of these optical assemblies may be integrated into a single optical assembly. While not depicted, the optical assemblies 200, 200' may further comprise additional optical components such as lenses, mirror, or the like.

Referring still to FIGS. 4 and 5, the infrared beam source 210 is a controlled heat source that outputs the infrared laser beam 212, which impinges the transparent workpiece 160, forming an infrared beam spot 214 on a surface (e.g., the first surface 162) of the transparent workpiece 160 and rapidly increasing the temperature of the transparent workpiece 160, for example, at or near the contour 170. In particular, laser energy of the infrared laser beam 212 is absorbed by the transparent workpiece 160, heating the material (e.g., glass material) of the transparent workpiece 160. Since the area of the heated transparent workpiece 160 surface is relatively small compared to the overall surface area of the transparent workpiece 160, the heated area cools relatively rapidly. Without being bound by theory, it is believed that the tensile stress may be caused by expansion of the glass (i.e., changed density) in portions of the transparent workpiece 160 with higher local temperature. When accumulated on or near the contour 170, this tensile stress drives formation of the crack 270 along the contour 170, thereby separating the transparent workpiece 160 along the contour 170. In operation, during propagation of the crack 270, the crack 270 comprises a crack tip 271, which is the leading edge of the crack 270.

The infrared beam source 210 may comprise any known or yet to be developed infrared beam source 210 configured to output infrared laser beams 212. Suitable infrared laser beams 212 to create thermal stress in glass would typically have wavelengths that are readily absorbed by glass, for example, wavelengths ranging from 1.2 µm to 13 µm, for example, a range of 4 µm to 12 µm. Further, the power of the infrared laser beam 212 may be from about 10 W to about 1000 W, for example 100 W, 250 W, 500 W, 750 W, or the like. Moreover, the $1/e^2$ beam diameter of the infrared laser beam 212 may be about 20 mm or less, for example, 15 mm, 12 mm, 10 mm, 8 mm, 5 mm, 2 mm, or less. In operation, a larger $1/e^2$ beam diameter of the infrared laser beam 212 may facilitate faster laser processing and more power while a smaller $1/e^2$ beam diameter of the infrared laser beam 212 may facilitate high precision separation by limiting damage to portions of the transparent workpiece 160 near the contour 170. Example infrared beam sources 210 include a carbon dioxide laser (a "$CO_2$ laser"), a carbon monoxide laser (a "CO laser"), a solid state laser, a laser diode, or combinations thereof.

Referring now to FIGS. 4-6, when separating the contour 170 of the transparent workpiece 160 using the infrared laser beam 212, the imaging system 250 may be used to detect a position and a propagation direction of the crack tip 271, which, as described in more detail below, allows the process controller 205 to analyze this data and modify the laser power of the infrared laser beam 212 and/or a speed of relative translation between the infrared laser beam 212 and the transparent workpiece 160 based on the position and propagation direction of the crack tip 271.

As depicted in FIG. 6, the imaging system 250 comprises one or more imaging apparatuses 254, such as cameras, and in some embodiments, a light source 252. The light source 252 may comprise a light emitting diode (LED), an incandescent light source, a laser source separate from the infrared beam source 210, or the like. Light output by the light source 252 and light received by the imaging apparatuses 254 (e.g., image data) may propagate along an imaging pathway 251. In some embodiments, light output by the light source 252 can be directed at the contour 170 and the crack tip 271 to illuminate the crack tip 271 to be imaged by the imaging apparatus 254. Further, the imaging apparatuses 254 may be positioned in a circumferential array, such that the imaging apparatuses 254 may surround the crack tip 271 and the infrared beam spot 214 when the imaging pathway 251 is aligned or nearly aligned with the infrared beam pathway 211 at the first surface 162 of the transparent workpiece 160. The circumferential array of imaging apparatuses 254 allows both positional and directional information to be determined from image data received by the imaging apparatuses 254. For example, the propagation direction of the crack tip 271 may be determined based on the relative intensity of image data received by each of the imaging apparatuses 254. While four imaging apparatuses 254 are shown in FIG. 6, it should be understood that any number of imaging apparatuses 254 are contemplated. Further, in the optical assembly 200' of FIG. 5 in which the imaging system 250 is disposed coaxial with the infrared beam source 210, the imaging apparatuses 254 may be disposed in a circumferential array having a cross sectional spacing (e.g., diameter) such that the infrared beam source 210 does not prevent the imaging apparatuses 254 from imaging the crack tip 271.

Referring again to FIG. 4, in the optical assembly 200, the imaging system 250 and the infrared beam source 210 are non-axially positioned and are each optically coupled to the beam steering apparatus 220. The beam steering apparatus 220 may comprise a partial reflector 222 configured to direct both the infrared laser beam 212 and light output by the light source 252 on or near the crack tip 271 and the infrared beam spot 214 such that the infrared beam pathway 211 and the imaging pathway 251 are aligned or nearly aligned at the first surface 162 of the transparent workpiece 160. In particular, the partial reflector 222 is configured to transmit the infrared laser beam 212 and reflect the light of the light source 252 and the image data receivable by the one or more imaging apparatuses 254. In other embodiments, for example, in an embodiment in which the position of the imaging system 250 and the infrared beam source 210 depicted in FIG. 4 are switched, the partial reflector 222 may be configured to reflect the infrared laser beam 212 and transmit the light of the light source 252 and the image data receivable by the one or more imaging apparatuses 254.

In some embodiments, the partial reflector 222 may comprise a ZnSe coating or any other know or yet to be developed partial reflector. While the beam steering apparatus 220 comprises a partial reflector 222 in the embodiment depicted in FIG. 4, it should be understood that the beam steering apparatus 220 may comprise any optical component or system configured to selectively direct the light of the light source 252, the image data receivable by the one or more imaging apparatuses 254 of the imaging system 250, and the infrared laser beam 212.

Referring again to FIGS. 4-6, a method of separating the transparent workpiece 160 along the contour 170 (and the contour line 165) comprises directing the infrared laser beam 212 onto the transparent workpiece 160 on or near the contour 170 (and the contour line 165) to induce formation of the crack 270 in the transparent workpiece 160 and translating the transparent workpiece 160 and the infrared laser beam 212 relative to each other along or near the contour 170 (and the contour line 165). During formation of the crack 270, the crack tip 271 and the infrared beam spot 214 each advance along the contour 170 in a translation direction 201. Further, when separating the transparent workpiece 160 along the contour 170, it may be ideal for the crack tip 271 to advance along the contour 170 at a steady rate in synchronization with the relative motion of the infrared laser beam 212 and the transparent workpiece 160 along the contour 170.

However, in some situations, the crack tip 271 may not propagate at a constant rate. For example, transient stress generated during the laser heating process can create buckling and deformation in the transparent workpiece 160, altering the stress distribution around the crack tip 271, causing unstable crack propagation. This may cause the crack tip 271 to stall and/or deviate from the contour 170, causing hackle and bifurcations on the newly formed edge surface. Such irregularities can reduce the strength of the separated transparent workpieces such that if the newly-formed edge surface of the separated transparent workpieces is placed in tension, such as by bending, a crack may originate from these irregularities and the separated transparent workpieces may break. Such weakened edges are an issue if incorporated into a downstream product, particularly one where the resultant individual transparent workpieces may undergo bending. Thus, to eliminate or reduce the occurrence of such strength-limiting defects and maximize the edge strength of separated transparent workpieces, additional method steps may be used to facilitate steady rate propagation of the crack tip 271 along the contour 170.

In particular, when translating the transparent workpiece 160 and the infrared laser beam 212 relative to each other along the contour 170 (and the contour line 165), the method of separating the transparent workpiece 160 may further comprise detecting a position and propagation direction of the crack tip 271 relative to a reference location and propagation direction of the infrared beam spot 214 of the infrared laser beam 212. The reference location may comprise any portion of the infrared beam spot 214, for example, a leading edge of the infrared beam spot 214, a trailing edge of the infrared beam spot 214, a mid-point of the infrared beam spot 214, or the like.

Detecting the position and propagation direction of the crack tip 271 may comprise generating image data of the crack tip 271 using the imaging system 250. For example, light from the light source 252 may be reflected by the crack tip 271, allowing imaging apparatus 254 to image the crack tip 271. Once image data of the crack tip 271 is acquired by the imaging apparatus 254, a position and a propagation direction of the crack tip 271 may be determined by analyzing the output of the imaging apparatus 254 using the process controller 205. Further the position and propagation direction of the infrared beam spot 214 may be determined using the imaging system 250 to generate image data of the infrared beam spot 214, by using data received from the infrared beam source 210 by the process controller 205, or a combination thereof.

After determining the position and propagation direction of both the crack tip 271 and the infrared beam spot 214, both a detected distance between the crack tip 271 and the reference location of the infrared beam spot 214 and a detected angular offset between the propagation direction of the crack tip 271 and the propagation direction of the infrared beam spot 214 may be determined. For example, the process controller 205 can use a stored instruction set to calculate a distance between a selected portion (e.g., the reference location) of the infrared beam spot 214 and the crack tip 271. For example, the process controller 205 may produce an intensity map of the acquired image data and comparing the intensity map to predetermined threshold value inputs, which may be stored in the process controller 205. Location of image intensity of the imaging map that exceeds the predetermined threshold intensity value stored in a memory of the process controller 205 can then be used to designate the position of the crack tip 271. In addition, the process controller 205 can use another stored instruction to calculate an angular offset between the propagation direction of the crack tip 271 and propagation direction of the infrared beam spot 214.

Next, the process controller 205 may compare the detected distance between the crack tip 271 and reference location of the infrared beam spot 214 to a preset distance and compare the detected angular offset between the propagation direction of the crack tip 271 and the propagation direction of the infrared beam spot 214 to a preset angular offset. After this comparison, at least one of a power of the infrared laser beam 212 or a speed of relative translation between the infrared laser beam 212 and the transparent workpiece 160 may be modified in response to a difference between the detected distance and the preset distance and a difference between the detected angular offset and the preset angular offset, for example, by generating and providing control signals using the process controller 205.

In some embodiments, when the detected distance is greater than the preset distance, the laser power of the infrared laser beam 212, the speed of relative translation between the infrared laser beam 212 and the transparent workpiece 160, or both, may be increased.

Conversely, when the detected distance is less than the preset distance, the laser power of the infrared laser beam 212, the speed of relative translation between the infrared laser beam 212 and the transparent workpiece 160, or both, may be decreased. Further, when the detected angular offset is greater than the preset angular offset, the laser power of the infrared laser beam 212, the speed of relative translation between the infrared laser beam 212 and the transparent workpiece 160, or both, may be increased. Conversely, when the detected angular offset is less than the preset angular offset, the speed of relative translation between the infrared laser beam 212 and the transparent workpiece 160, or both, may be decreased.

In some embodiments, the preset distance may comprise from about 0.5 mm to about 100 mm, such as about 1 mm to about 75 mm, about 1 mm to about 50 mm, about 1 mm to about 40 mm, about 1 mm to about 30 mm, about 1 mm to about 25 mm, about 1 mm to about 20 mm, and all ranges and sub-ranges therebetween. For example, the preset distance may comprise about 100 mm or less, about 75 mm or less, about 50 mm or less, about 25 mm or less, about 20 mm or less, about 15 mm or less, about 10 mm or less, about 5 mm or less, or the like. In some embodiments, the preset angular offset may comprise from about 1 to about 180°, for example, about 5° to about 90°, about 5° to about 60°, about 5° to about 45°, and all ranges and sub-ranges therebetween. For example, the preset angular offset may comprise about 10° or great, about 20° or greater, about 30° or greater, about 45° or greater, about 60° or greater, about 90° or greater, or the like.

Figure 7A:
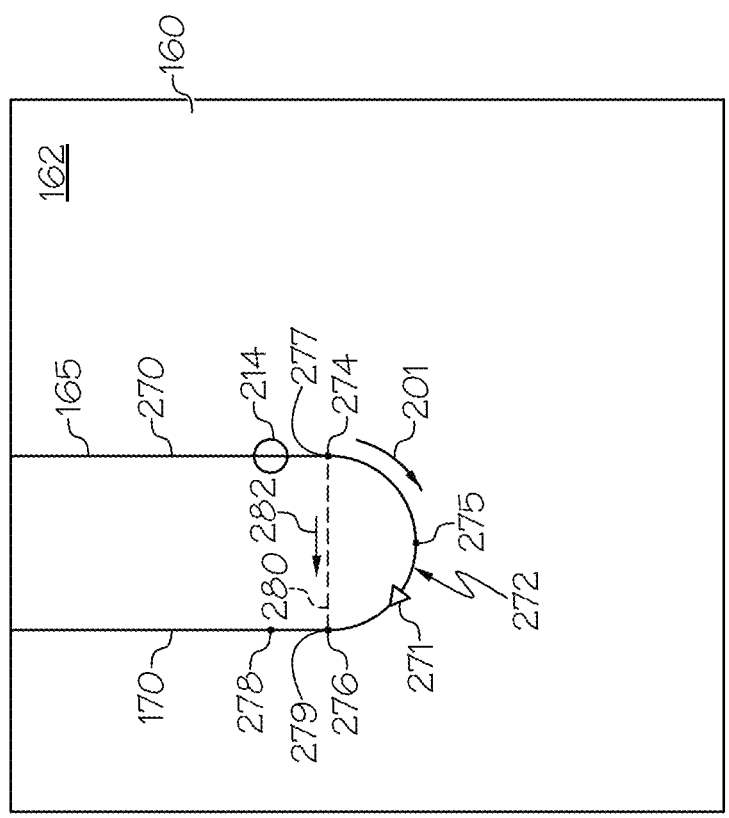
FIG. 7A schematically depicts an infrared beam spot and crack tip during separation of the transparent workpiece along a contour disposed in the transparent workpiece, according to one or more embodiments shown and described herein.
Figure 7B:
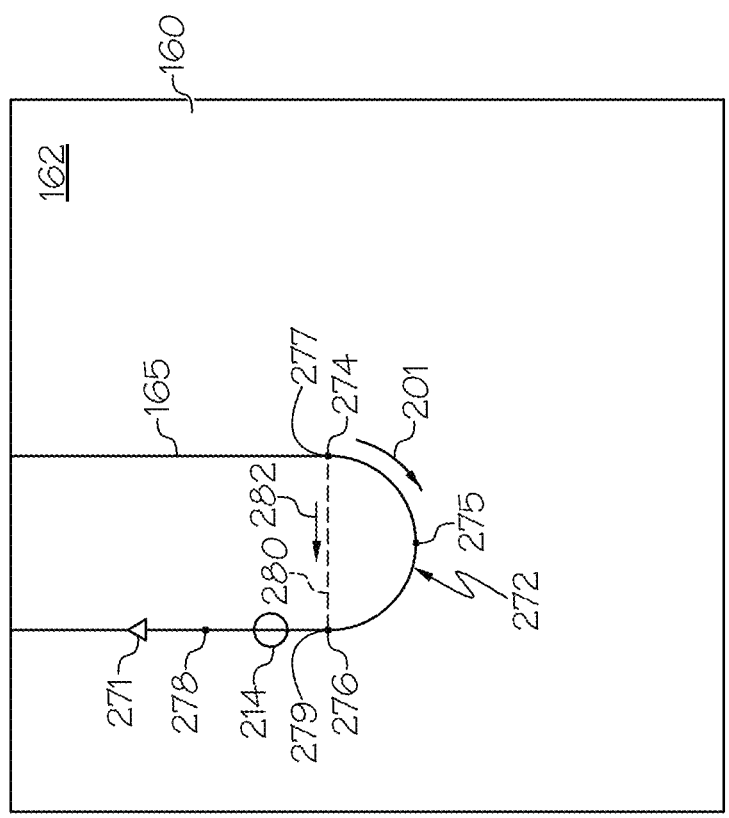
FIG. 7B schematically depicts the infrared beam spot and crack tip of FIG. 7A located at different positions along the contour during separation of the transparent workpiece along the contour, according to one or more embodiments shown and described herein.

Referring now to FIGS. 7A and 7B, the infrared beam spot 214 is depicted traversing the contour 170 (and the contour line 165), which includes the curved contour portion 272, to induce propagation of the crack 270 and separate the transparent workpiece 160. When the infrared laser beam 212 traverses the curved contour portion 272, excessive heat may accumulate within the material of the transparent workpiece 160 near the curved contour portion 272 due to the geometry of the curved contour portion 272. In particular, the bend of the curved contour portion 272 places segments of the curved contour portion 272 close to the infrared beam spot 214 even when these segments are not directly impinged by the infrared laser beam 212. This excessive heat and/or latent stress may generate unwanted chippings, cracking, hackle, and/or bifurcations when the crack tip 271 propagates along the curved contour portion 272 of the contour 170. As described previously, such irregularities can reduce the strength of the separated transparent workpieces.

Thus, to eliminate or reduce the occurrence of such strength-limiting defects and maximize the edge strength of separated transparent workpieces, additional method steps may be used to reduce excessive heat accumulation along the curved contour portion 272 of the contour 170 while still inducing propagation of the crack tip 271 through the curved contour portion 272. For example, these additional method steps may include temporarily terminating crack-inducing irradiation of the transparent workpiece 160 by the infrared laser beam 212 when the crack tip 271 is propagating through some or all of the curved contour portion 272 and resuming crack-inducing irradiation of the transparent workpiece 160 at a location along the contour 170 (and the contour line 165) beyond the curved contour portion 272 once the crack tip 271 is beyond the curved contour portion 272. As used herein, "crack-inducing irradiation" refers to irradiation (e.g., irradiation by the infrared laser beam 212) having a laser power sufficient to induce separation of the transparent workpiece 160 along the contour 170.

Referring still to FIGS. 7A and 7B, the curved contour portion 272 comprises a first end point 277, a midpoint 275, and a second end point 279. Further, a number of reference points are shown along the contour 170 (and the contour line 165) in relation to the curved contour portion 272, including a first reference point 274, a second reference point 276, and a third reference point 278. The first reference point 274 is located behind the second reference point 276 and the third reference point 278, such that when following the contour 170 (and the contour line 165) in a translation direction 201, one would reach the first reference point 274 before reaching the second reference point 276 and the third reference point 278. In some embodiments, the second reference point 276 and the third reference point 278 are co-located. In other embodiments, the second reference point 276 is spaced apart from the third reference point 278. In the embodiment depicted in FIGS. 7A and 7B, the second reference point 276 is positioned behind the third reference point 278 such that when following the contour 170 (and the contour line 165) in the translation direction 201, one would reach the second reference point 276 before reaching the third reference point 278. In other embodiments, the third reference point 278 may be positioned behind the second reference point 276 such that when following the contour 170 (and the contour line 165) in the translation direction 201, one would reach the third reference point 278 before reaching the second reference point 276.

In some embodiments, as depicted in FIGS. 7A and 7B, the first reference point 274 is located behind the midpoint 275 of the curved contour portion 272, for example, between the first end point 277 and the midpoint 275, at the midpoint 275, at the first end point 277, or behind the first end point 277. In other embodiments, the first reference point 274 may be located beyond the midpoint 275, for example between the second end point 279 and the midpoint 275. In some embodiments, the second reference point 276, the third reference point 278, or both are located beyond the midpoint 275, for example, between the second end point 279 and the midpoint 275, at the midpoint 275, at the second end point 279, or beyond the second end point 279. In other embodiments, the first reference point 274 may be located behind the midpoint 275, for example between the first end point 277 and the midpoint 275. While a variety of reference point arrangements are contemplated, in each embodiment, the first reference point 274 is located behind the second reference point 276 and the third reference point 278, at least some of the curved contour portion 272 is disposed between the first reference point 274 and the second reference point 276, and at least some of the curved contour portion 272 is disposed between the first reference point 274 and the third reference point 278.

As described above, separating the transparent workpiece 160 comprises directing the infrared laser beam 212 output by the infrared beam source 210 (FIGS. 4 and 5) along the infrared beam pathway 211 onto the transparent workpiece 160 on or near the contour 170 to induce formation of the crack 270 in the transparent workpiece 160, translating the transparent workpiece 160 and the infrared laser beam 212 relative each other along or near the contour 170 (and the contour line 165) to induce propagation of the crack 270 and the crack tip 271 along the contour 170, and detecting a position of the crack tip 271 and a position of an infrared beam spot 214 of the infrared laser beam 212, for example, using any of the methods and systems described above with respect to FIGS. 4A-5B.

To eliminate or reduce the occurrence of strength-limiting defects and maximize the edge strength of separated transparent workpieces when the contour 170 comprises the curved contour portion 272, separating the transparent workpiece 160 may further comprise terminating crack-inducing irradiation from the infrared laser beam when the infrared beam spot reaches the first reference point 274. For example, terminating crack-inducing irradiation from the infrared laser beam 212 may comprise terminating output of the infrared laser beam 212 by the infrared beam source 210, reducing the laser power of the infrared laser beam 212 such that the laser power of the infrared laser beam 212 is not sufficient to induce separation of the transparent workpiece 160 along the contour 170, or directing the infrared laser beam 212 away from the transparent workpiece 160, for example, using one or more additional optical components.

After terminating crack-inducing irradiation from the infrared laser beam 212, the transparent workpiece 160 and the infrared beam pathway 211 may be translated relative each other from the first reference point 274 to the second reference point 276. Relative translation of the transparent workpiece 160 and the infrared beam pathway 211 from the first reference point 274 to the second reference point 276 may comprise translation of the transparent workpiece 160, translation of the infrared beam source 210, translation of optical components optically coupled to the infrared beam source 210, and/or realignment of optical components optically coupled to the infrared beam source 210 such that when resuming crack-inducing irradiation, the infrared laser beam 212 irradiates the second reference point 276. In operation, the transparent workpiece 160 and the infrared beam pathway 211 are translated relative each other along a jump pathway 280 in a translation direction 282 from the first reference point 274 to the second reference point 276. In some embodiments, the jump pathway 280 is a linear pathway. Further, while the crack-inducing irradiation is terminated, latent heat accumulation within the material of the transparent workpiece 160 propels propagation of the crack tip 271 along the curved contour portion 272.

Next, when the crack tip 271 reaches the third reference point 278, which may occur after or simultaneous with the arrival of the infrared beam pathway 211 at the second reference point 276, the method further comprises resuming crack-inducing irradiation from the infrared laser beam 212 and resuming translation of the transparent workpiece 160 and the infrared laser beam 212 relative each other along or near the contour 170 (and the contour line 165). For example, resuming crack-inducing irradiation from the infrared laser beam 212 may comprise resuming output of the infrared laser beam 212 by the infrared beam source 210, increasing the laser power of the infrared laser beam 212 such that the laser power of the infrared laser beam 212 is sufficient to induce separation of the transparent workpiece 160 along the contour 170, or directing the infrared laser beam 212 back onto the transparent workpiece 160, for example, using one or more additional optical components.

Figure 8:
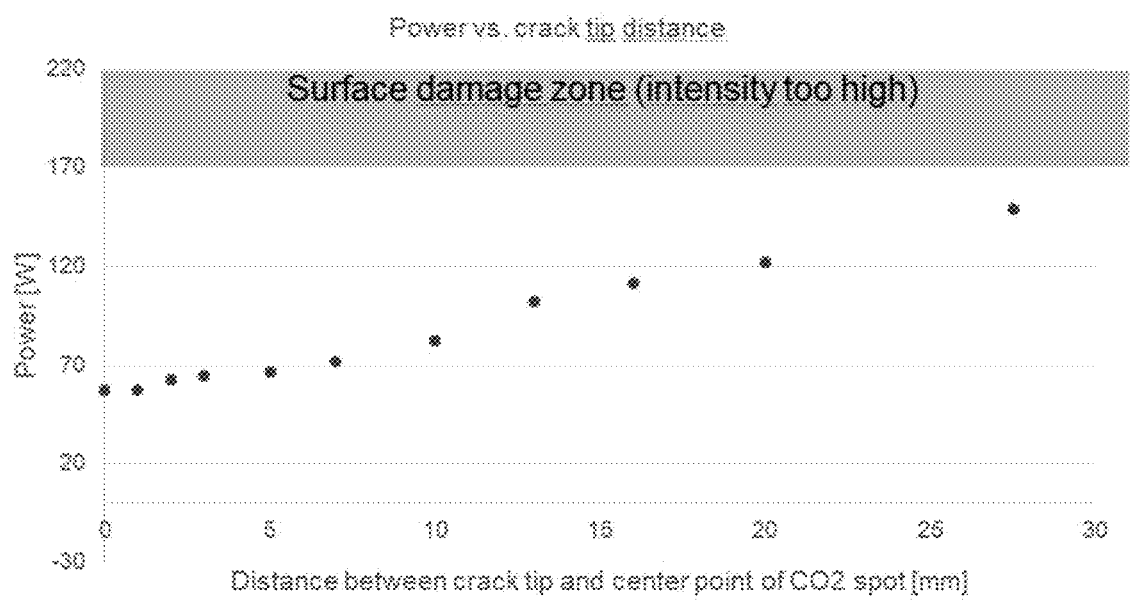
FIG. 8 depicts a chart showing the infrared laser beam power needed for full separation of the glass plotted against the distance between the crack tip and the center of the infrared laser beam according to one or more embodiments shown and described herein.

EXPERIMENT: A square piece of NIOX 2320 glass having a length of 100 mm, a width of 100 mm, and a thickness of 0.7 mm is placed on a substrate carrier and held in place by −55 mbarr of vacuum. An infrared laser beam having a $1/e^2$ beam diameter of 5.2 mm is directed onto the glass at a first edge. In order to fully separate the glass into two pieces, the crack tip must reach a second edge, opposite the first edge. The infrared laser beam travels from the first edge to the second edge and is stopped a distance x from the second edge. At a distance x of 27.5 mm full separation of the glass is achieved using 150 W of infrared laser beam power. Power of 170w and greater will damage the surface of the glass (heat crack). FIG. 8 depicts a chart showing the infrared laser beam power needed for full separation of the glass plotted against the distance between the crack tip and the center of the infrared laser beam.

In view of the foregoing description, it should be understood that laser processing of transparent workpieces may comprise forming a contour comprising a plurality of defects in the transparent workpiece using a defect forming laser beam (e.g., a pulsed laser beam) and separating the transparent workpiece using an infrared laser beam to induce propagation of a crack along the contour to separate the transparent workpiece. Further, laser processing transparent workpieces may include altering the relative translation speed between the transparent workpiece and the infrared laser beam and/or the laser power of the infrared laser beam in response to a measured location and propagation direction of a crack tip to facilitate consistent separation of the crack and limit the formation of strength-limiting features in the separated transparent workpieces. Moreover, laser processing transparent workpieces may also include terminating crack-inducing irradiation from the infrared laser beam when the crack is propagating through a curved contour portion of the contour, allowing latent heat accumulation to propel crack propagation through the curved contour portion and resuming crack-inducing irradiation from the infrared laser beam at a location of the contour beyond the curved contour portion.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for processing a transparent workpiece, the method comprising:
   forming a contour along a contour line in the transparent workpiece, the contour comprising a plurality of defects in the transparent workpiece;
   separating the transparent workpiece along the contour, wherein separating the transparent workpiece comprises:
      directing an infrared laser beam output by an infrared laser beam source onto the transparent workpiece on or near the contour line to induce formation of a crack in the transparent workpiece, wherein the infrared laser beam projects an infrared beam spot on a surface of the transparent workpiece;
      translating the transparent workpiece and the infrared laser beam relative to each other along or near the contour line to induce propagation of the crack along the contour, wherein during propagation of the crack, the crack comprises a crack tip;
      detecting a position and propagation direction of the crack tip relative to a reference location and propagation direction of the infrared beam spot;
      determining a detected distance between the crack tip and the reference location of the infrared beam spot;
      determining a detected angular offset between the propagation direction of the crack tip and the propagation direction of the infrared beam spot;
      comparing the detected distance to a preset distance;
      comparing the detected angular offset to a preset angular offset; and
      modifying at least one of a power of the infrared laser beam or a speed of relative translation between the infrared laser beam and the transparent workpiece in response to a difference between the detected distance and the preset distance and a difference between the detected angular offset and the preset angular offset.

2. The method of claim 1, wherein:
   when the detected distance is greater than the preset distance, the method further comprises increasing a laser power of the infrared laser beam; and
   when the detected distance is less than the preset distance, the method further comprises decreasing the laser power of the infrared laser beam.

3. The method of claim 1, wherein:
   when the detected distance is greater than the preset distance, the method further comprises increasing the speed of relative translation between the infrared laser beam and the transparent workpiece; and when the detected distance is less than the preset distance, the method further comprises decreasing the speed of relative translation between the infrared laser beam and the transparent workpiece.

4. The method of claim 1, wherein:
when the detected angular offset is greater than the preset angular offset, the method further comprises increasing the laser power of the infrared laser beam; and
when the detected angular offset is less than the preset angular offset, the method further comprises decreasing the laser power of the infrared laser beam.

5. The method of claim 1, wherein the reference location of the infrared beam spot is a mid-point of the infrared beam spot.

6. The method of claim 1, wherein the preset distance is about 50 mm or less and the preset angular offset is about 20° or greater.

7. The method of claim 1, wherein detecting the position and propagation direction of the crack tip comprises generating image data of the crack tip and the infrared beam spot using an imaging system comprising one or more imaging apparatuses.

8. The method of claim 7, wherein the imaging system further comprises a light source and wherein generating image data of the crack tip comprises illuminating the crack tip with the light source.

9. The method of claim 7, wherein the one or more imaging apparatuses are translatable relative to the transparent workpiece.

10. The method of claim 7, wherein the one or more imaging apparatuses are arranged in a circumferential array coaxial with the infrared laser beam source.

11. The method of claim 7, wherein the imaging system and the infrared laser beam source are optically coupled to a beam steering apparatus.

12. A method for processing a transparent workpiece, the method comprising:
forming a contour along a contour line in the transparent workpiece, the contour comprising a plurality of defects in the transparent workpiece and a curved contour portion; and
separating the transparent workpiece along the contour, wherein separating the transparent workpiece comprises:
directing an infrared laser beam output by an infrared laser beam source along an infrared beam pathway onto the transparent workpiece on or near the contour line to induce formation of a crack in the transparent workpiece;
translating the transparent workpiece and the infrared laser beam relative to each other along or near the contour line to induce propagation of the crack along the contour, wherein during propagation of the crack, the crack comprises a crack tip;
detecting a position of the crack tip and a position of an infrared beam spot of the infrared laser beam via an imaging system, wherein the imaging system and the infrared beam source are coaxially positioned, forming an in-line system;
terminating crack-inducing irradiation from the infrared laser beam when the infrared beam spot reaches a first reference point located along the contour line;
translating the transparent workpiece and the infrared beam pathway relative to each other from the first reference point to a second reference point located along the contour line, wherein the first reference point is located behind the second reference point and at least some of the curved contour portion is disposed between the first reference point and the second reference point; and
resuming crack-inducing irradiation from the infrared laser beam and translation of the transparent workpiece and the infrared laser beam relative to each other along or near the contour line when the crack tip reaches a third reference point located along the contour line, wherein the first reference point is located behind the third reference point and at least some of the curved contour portion is disposed between the first reference point and the third reference point.

13. The method of claim 12, wherein the second reference point is either co-located with the third reference point or is located behind the third reference point.

14. The method of claim 12, wherein the first reference point is located behind a midpoint of the curved contour portion and the second reference point is located beyond the midpoint of the curved contour portion.

15. The method of claim 12, wherein:
the transparent workpiece and the infrared beam pathway are translated relative each other along a jump pathway from the first reference point to the second reference point; and
the jump pathway comprises a linear pathway.

16. The method of claim 12, wherein detecting the position of the crack tip comprises generating image data of the crack tip using an imaging system comprising one or more imaging apparatuses, wherein the imaging system further comprises a light source and wherein generating image data of the crack tip comprises illuminating the crack tip with the light source.

17. The method of claim 16, wherein the one or more imaging apparatuses are translatable relative to the transparent workpiece.

18. The method of claim 16, wherein the imaging system and the infrared beam source are optically coupled to a beam steering apparatus.

19. The method of claim 12, wherein forming the contour in the transparent workpiece comprises:
directing a defect-forming laser beam into the transparent workpiece, thereby generating an induced absorption within the transparent workpiece, the induced absorption producing a defect within the transparent workpiece; and
translating the transparent workpiece and the defect-forming laser beam relative to each other along the contour line, wherein the defect-forming laser beam comprises a pulsed laser beam output by a beam source that produces pulse bursts comprising 2 sub-pulses per pulse burst or more.

20. The method of claim 19, wherein the defect-forming laser beam is directed through one or more lenses such that a portion of the defect-forming laser beam directed into the transparent workpiece forms a laser beam focal line within the transparent workpiece, wherein the laser beam focal line generates the induced absorption within the transparent workpiece, the induced absorption producing the defects within the transparent workpiece, wherein at least one of the one or more lenses comprises an aspheric optical element.

21. A method for processing a transparent workpiece, the method comprising:
forming a contour along a contour line in the transparent workpiece, the contour comprising a plurality of defects in the transparent workpiece;

separating the transparent workpiece along the contour, wherein separating the transparent workpiece comprises:
  directing an infrared laser beam output by an infrared laser beam source onto the transparent workpiece on or near the contour line to induce formation of a crack in the transparent workpiece, wherein the infrared laser beam projects an infrared beam spot on a surface of the transparent workpiece, wherein the portion of the laser beam directed into the transparent workpiece comprises:
    a wavelength $\lambda$;
    an effective spot size $w_{o,eff}$; and
  a non-axisymmetric beam cross section that comprises a minimum Rayleigh range $Z_{Rx,min}$ in a cross-sectional x-direction and a minimum Rayleigh range $Z_{Ry,min}$ in a cross-sectional y-direction, wherein the smaller of and $Z_{Rx,min}$ and $Z_{Ry,min}$ is greater than $$F_D \frac{\pi w_{o,eff}^2}{\lambda},$$

where $F_D$, is a dimensionless divergence factor comprising a value of 10 or greater;

translating the transparent workpiece and the infrared laser beam relative to each other along or near the contour line to induce propagation of the crack along the contour, wherein during propagation of the crack, the crack comprises a crack tip;

detecting a position and propagation direction of the crack tip relative to a reference location and propagation direction of the infrared beam spot;

determining a detected distance between the crack tip and the reference location of the infrared beam spot;

comparing the detected distance to a preset distance; and modifying at least one of a power of the infrared laser beam or a speed of relative translation between the infrared laser beam and the transparent workpiece in response to a difference between the detected distance and the preset distance.

* * * * *

UNITED STATES PATENT AND TRADEMARK OFFICE
CERTIFICATE OF CORRECTION

PATENT NO. : 11,629,088 B2
APPLICATION NO. : 16/443020
DATED : April 18, 2023
INVENTOR(S) : Duc Anh Bui et al.

It is certified that error appears in the above-identified patent and that said Letters Patent is hereby corrected as shown below:

In the Claims

In Column 31, Line 17, in Claim 21, after "of" delete "and".

In Column 32, Line 1, in Claim 21, delete "$F_D$," and insert -- $F_D$ --.

Signed and Sealed this
First Day of August, 2023

Katherine Kelly Vidal
*Director of the United States Patent and Trademark Office*